United States Patent
Uchiumi et al.

(10) Patent No.: US 9,736,497 B2
(45) Date of Patent: Aug. 15, 2017

(54) PREDICTION VECTOR GENERATION DEVICE, IMAGE ENCODING DEVICE, IMAGE DECODING DEVICE, PREDICTION VECTOR GENERATION METHOD, AND PROGRAM

(71) Applicant: Sharp Kabushiki Kaisha, Osaka-shi, Osaka (JP)

(72) Inventors: Tadashi Uchiumi, Osaka (JP); Tomohiro Ikai, Osaka (JP); Yoshiya Yamamoto, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 361 days.

(21) Appl. No.: 14/412,789

(22) PCT Filed: Jul. 2, 2013

(86) PCT No.: PCT/JP2013/068101
§ 371 (c)(1),
(2) Date: Jan. 5, 2015

(87) PCT Pub. No.: WO2014/010464
PCT Pub. Date: Jan. 16, 2014

(65) Prior Publication Data
US 2015/0146786 A1 May 28, 2015

(30) Foreign Application Priority Data
Jul. 10, 2012 (JP) .................................. 2012-155037

(51) Int. Cl.
*H04N 19/597* (2014.01)
*H04N 19/42* (2014.01)
(Continued)

(52) U.S. Cl.
CPC ........... *H04N 19/597* (2014.11); *H04N 19/43* (2014.11); *H04N 19/52* (2014.11); *H04N 19/521* (2014.11)

(58) Field of Classification Search
CPC .... H04N 19/597; H04N 19/521; H04N 19/43; H04N 19/52
See application file for complete search history.

(56) References Cited

U.S. PATENT DOCUMENTS

2013/0335527 A1* 12/2013 Takahashi ............ H04N 19/597
348/43

FOREIGN PATENT DOCUMENTS

WO  2014/005548 A1  1/2014

OTHER PUBLICATIONS

Official Communication issued in International Patent Application No. PCT/JP2013/068101, mailed on Oct. 15, 2013.
(Continued)

*Primary Examiner* — Nam Pham
(74) *Attorney, Agent, or Firm* — Keating & Bennett, LLP

(57) ABSTRACT

A prediction vector generation device generating a prediction vector of a disparity vector of a target block in a non-base viewpoint image includes a conversion pixel determination unit determining at least one pixel position in a depth block corresponding to the target block in a depth map corresponding to the non-base viewpoint image, a disparity vector conversion unit calculating a representative value of a depth value of the at least one pixel position determined by the conversion pixel determination unit and converting the representative value into a disparity vector, and a prediction vector determination unit generating the prediction vector of the disparity vector of the target block by using the disparity vector generated by the disparity vector conversion unit. This prediction vector generation device provides good (Continued)

encoding efficiency and suppresses increases in the amount of computation.

2 Claims, 16 Drawing Sheets

(51) Int. Cl.
    *H04N 19/52*     (2014.01)
    *H04N 19/43*     (2014.01)
    *H04N 19/513*    (2014.01)

(56) References Cited

OTHER PUBLICATIONS

"Series H: Audiovisual and Multimedia Systems, Infrastructure of Audiovisual Services—Coding of Moving Video, Advanced Video Coding for Generic Audiovisual Services," ITU-T Telecommunication Standardization Sector of ITU, H.264, Mar. 2010, 676 pages.
Bross et al., "High Efficiency Video Coding (HEVC) Text Specification Draft 6," Joint Collaborative Team on Video Coding (JCT-VC) of ITU-T SG16 WP3 and ISO-IEC JTCI/SC29/WG11, JCTVC-H1003: San Jose, CA, Feb. 1-10, 2012, 259 pages.
Kimata, "Trend in International Standardization of 3D Video Coding," NTT Technical Review, Aug. 2011, pp. 63-67.
Shimizu et al., "Efficient Multi-View Video Coding Using Multi-View Video Depth Map," The Journal of the Institute of Image Information and Television Engineers, vol. 63, No. 4, Apr. 1, 2009, pp. 524-532.

\* cited by examiner

US 9,736,497 B2

PREDICTION VECTOR GENERATION DEVICE, IMAGE ENCODING DEVICE, IMAGE DECODING DEVICE, PREDICTION VECTOR GENERATION METHOD, AND PROGRAM

TECHNICAL FIELD

The present invention relates to a prediction vector generation device, an image encoding device, an image decoding device, a prediction vector generation method, and a program.

Priority is claimed on Japanese Patent Application No. 2012-155037, filed Jul. 10, 2012, the content of which is incorporated herein by reference.

BACKGROUND ART

In encoding of a moving image, motion prediction is performed. In motion prediction, a frame is partitioned into blocks and images similar to the blocks are acquired from another frame and used as prediction images. The vectors indicating the images similar to the blocks are referred to as motion vectors and the motion vectors of the blocks are predicted based on the motion vectors of the neighboring blocks of the blocks (for example, see NPL 1 and NPL 2). The vector acquired by prediction of a motion vector is referred to as a prediction vector.

International Organization for Standardization (ISO) is standardizing MPEG-3DV, which is a standard for three-dimensional video encoding and encodes a plurality of viewpoint images and depth maps (NPL 3).

CITATION LIST

NPL 1: Recommendation ITU-T H.264 "Advanced video coding for generic audiovisual services", March 2010
NPL 2: "High efficiency video coding (HEVC) text specification draft 6", JCTVC-H1003, San Jose, Calif., USA, February, 2012
NPL 3: "International Standardization Trends of Three-Dimensional Video Encoding", NTT Gijutsu Journal, pp. 63-67, 2011.8

DISCLOSURE OF THE INVENTION

Problems to be Solved by the Invention

However, when a plurality of viewpoint images are encoded as in MPEG-3DV described above, not only motion prediction described above, but also disparity prediction is performed. In disparity prediction, an image similar to a target block is acquired from another viewpoint image and the acquired image is used as a prediction image. In this case, as described in NPL 1, even when an attempt is made to use the disparity vector of a neighboring block during prediction of a disparity vector, if the neighboring block generates a prediction image using motion prediction, the disparity vector of the neighboring block cannot be acquired. Accordingly, the precision of a prediction vector is reduced and good encoding efficiency may not be acquired.

The present invention addresses the above problems with the object of providing a prediction vector generation device, image encoding device, image decoding device, prediction vector generation method, and program that can acquire good encoding efficiency.

Means for Solving the Problems (1) The present invention is made to solve the above problems and an aspect of the present invention is a prediction vector generation device generating a prediction vector of a disparity vector of a target block in a non-base viewpoint image, including a conversion pixel determination unit determining at least one pixel position in a depth block corresponding to the target block in a depth map corresponding to the non-base viewpoint image, a disparity vector conversion unit calculating a representative value of a depth value of the at least one pixel position determined by the conversion pixel determination unit and converting the representative value into a disparity vector, and a prediction vector determination unit generating the prediction vector of the disparity vector of the target block by using the disparity vector generated by the disparity vector conversion unit.

(2) Another aspect of the present invention is the prediction vector generation device described in (1), in which the conversion pixel determination unit determines the at least one pixel position in accordance with a determination rule selected depending on a size of the target block.

(3) Another aspect of the present invention is a prediction vector generation device generating a prediction vector of a disparity vector of a target block in a non-base viewpoint image, including a motion vector acquisition unit acquiring a motion vector with respect to a block corresponding to the target block in a viewpoint image different from the non-base viewpoint image, a disparity vector acquisition unit selecting a first acquisition method that references the acquired motion vector, selects a block in a viewpoint image at another time of the non-base viewpoint image, and acquires a disparity vector with respect to the block or a second acquisition method that acquires a disparity vector with respect to an adjacent block of the target block and acquiring a disparity vector using the selected acquisition method, and a prediction vector determination unit determining the prediction vector of the disparity vector of the target block by using the disparity vector acquired by the disparity vector acquisition unit.

(4) Another aspect of the present invention is the prediction vector generation device described in (3), in which the disparity vector acquisition unit selects the first acquisition method or the second acquisition method depending on a size of the target block.

(5) Another aspect of the present invention is an image encoding device including the prediction vector generation device described in any one of (1) to (4).

(6) Another aspect of the present invention is an image decoding device including the prediction vector generation device described in any one of (1) to (4).

(7) Another aspect of the present invention is a prediction vector generation method generating a prediction vector of a disparity vector of a target block in a non-base viewpoint image, including a first step of determining at least one pixel position in a depth block corresponding to the target block in a depth map corresponding to the non-base viewpoint image, a second step of calculating a representative value of a depth value of the at least one pixel position determined in the first step and converting the representative value into a disparity vector, and a third step of generating the prediction vector of the disparity vector of the target block by using the disparity vector generated in the second step.

(8) Another aspect of the present invention is a prediction vector generation method generating a prediction vector of a disparity vector of a target block in a non-base viewpoint image, including a first step of acquiring a motion vector with respect to a block corresponding to the target block in a viewpoint image different from the non-base viewpoint image, a second step of acquiring a disparity vector by using a first acquisition method that references the acquired motion vector, selects a block in a viewpoint image at another time of the non-base viewpoint image, and acquires a disparity vector with respect to the block or a second acquisition method that acquires a disparity vector with respect to an adjacent block of the target block, and a third step of determining the prediction vector of the disparity vector of the target block by using the disparity vector acquired in the second step.

(9) Another aspect of the present invention is a program causing a computer to function as a prediction vector generation device generating a prediction vector of a disparity vector of a target block in a non-base viewpoint image, the prediction vector generation device including a conversion pixel determination unit determining at least one pixel position in a depth block corresponding to the target block in a depth map corresponding to the non-base viewpoint image, a disparity vector conversion unit calculating a representative value of a depth value of the at least one pixel position determined by the conversion pixel determination unit and converting the representative value into a disparity vector, and a prediction vector determination unit generating the prediction vector of the disparity vector of the target block by using the disparity vector generated by the disparity vector conversion unit.

(10) Another aspect of the present invention is a program causing a computer to function as a prediction vector generation device generating a prediction vector of a disparity vector of a target block in a non-base viewpoint image, the prediction vector generation device including a motion vector acquisition unit acquiring a motion vector with respect to a block corresponding to the target block in a viewpoint image different from the non-base viewpoint image, a disparity vector acquisition unit acquiring a disparity vector by using a first acquisition method referencing the acquired motion vector, selecting a block in a viewpoint image at another time of the non-base viewpoint image, and acquiring a disparity vector with respect to the block or a second acquisition method acquiring a disparity vector with respect to an adjacent block of the target block, and a prediction vector determination unit determining the prediction vector of the disparity vector of the target block by using the disparity vector acquired by the disparity vector acquisition unit.

Effects of the Invention

According to the present invention, good encoding efficiency is obtained and increases in the amount of computation in encoding and decoding can be suppressed.

BEST MODE FOR CARRYING OUT THE INVENTION

First Embodiment

Figure 1:
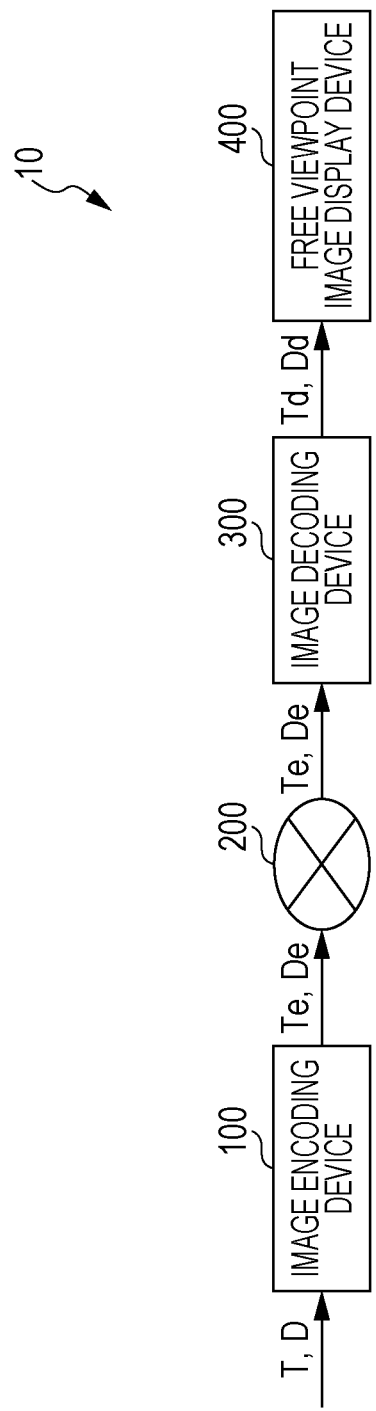
FIG. 1 is a block diagram schematically showing the structure of an image transmission system 10 according to a first embodiment of the present invention.

A first embodiment of the present invention will be described with reference to the drawings. FIG. 1 is a block diagram schematically showing the structure of an image transmission system 10 according to the first embodiment of the present invention. The image transmission system 10 encodes and transmits a plurality of viewpoint images and depth maps and enables a free viewpoint image using the viewpoint images and depth maps to be displayed at the transmission destination. As shown in FIG. 1, the image transmission system 10 includes an image encoding device 100, a network 200, an image decoding device 300, and a free viewpoint image display device 400.

The image encoding device 100 encodes a plurality of viewpoint images (also referred to as texture images) T to generate an encoded stream Te of each of the viewpoint images T. In addition, the image encoding device 100 encodes a depth map D corresponding to each of the encoded viewpoint images T to generate a depth map encoded stream De of the depth map. The network 200 is a network such as an Internet Protocol (IP) network or cable television network that transmits the encoded streams Te and the depth map encoded streams De to the image decoding device 300. The encoded stream Te and the depth map encoded stream De may be transmitted via a network as in the present embodiment, may be transmitted via broadcast waves such as terrestrial digital broadcast or satellite broadcast, or may be transmitted via a recording medium such as a digital versatile disc (DVD) or Blu-ray® disc.

The image decoding device 300 decodes the encoded stream Te and the depth map encoded stream De transmitted by the network 200 to generate a decoded viewpoint image Td and a decoded depth map Dd. The free viewpoint image display device 400 generates an image from any viewpoint using the decoded viewpoint image Td and the decoded depth map Dd generated by the image decoding device 300. The free viewpoint image display device 400 has a display device such as a liquid crystal display or organic electroluminescence (EL) display and displays the generated image from any viewpoint using the display device. The image from any viewpoint may be a two-dimensional image or three-dimensional image.

Figure 2:
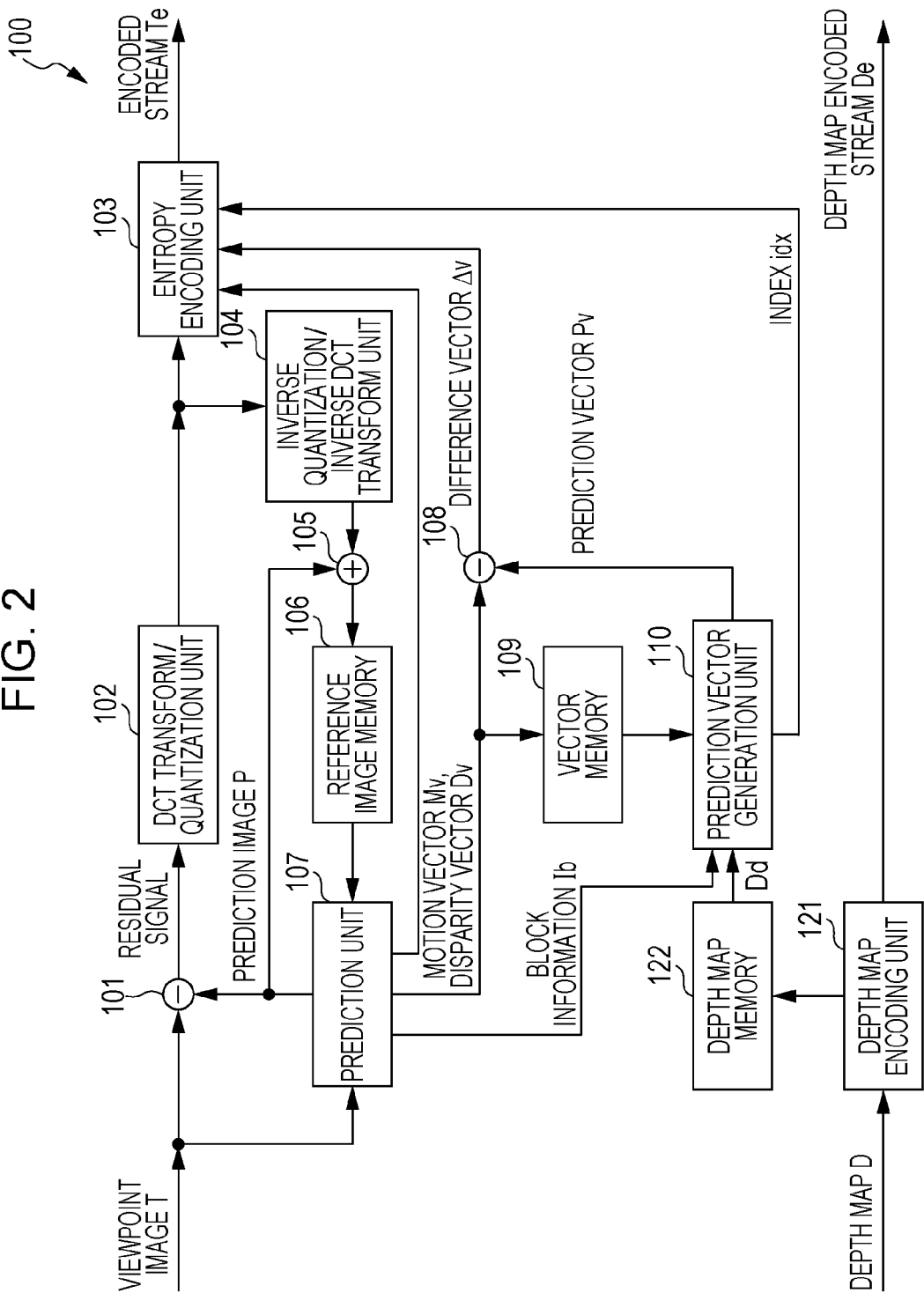
FIG. 2 is a block diagram schematically showing the structure of an image encoding device 100 according to the embodiment.

FIG. 2 is a block diagram schematically showing the structure of the image encoding device 100. As shown in FIG. 2, the image encoding device 100 includes a subtraction unit 101, a discrete cosine transform (DCT) transform/quantization unit 102, an entropy encoding unit 103, an inverse quantization/inverse DCT transform unit 104, an addition unit 105, a reference image memory 106, a prediction unit 107, a subtraction unit 108, a vector memory 109, a prediction vector generation unit 110 (prediction vector generation device), a depth map encoding unit 121, and a depth map memory 122.

The subtraction unit 101 subtracts a prediction image P generated by the prediction unit 107 from the input viewpoint image T and generates a residual signal indicating the result of the subtraction. The subtraction means subtraction of the pixel value of the pixel corresponding to the prediction image P from the pixel value of the pixel of the viewpoint image T. The DCT transform/quantization unit 102 DCT-transforms a residual signal generated by the subtraction unit 101 to calculate the DCT coefficient. The DCT transform/quantization unit 102 quantizes the calculated DCT coefficient to calculate the quantization coefficient. The entropy encoding unit 103 entropy-encodes the quantization coefficient calculated by the DCT transform/quantization unit 102, the difference vector Δv calculated by the subtraction unit 108, the index idx selected by the prediction vector generation unit 110, and the prediction mode selected by the prediction unit 107 to generate an encoded stream Te.

The inverse quantization/inverse DCT transform unit 104 inverse-quantizes the quantization coefficient calculated by the DCT transform/quantization unit 102. In addition, the inverse quantization/inverse DCT transform unit 104 inverse-DCT-transforms the result of inverse quantization to generate a decoded residual signal. The addition unit 105 adds the decoded residual signal generated by the inverse quantization/inverse DCT transform unit 104 to the prediction image P generated by the prediction unit 107 to generate a decoding image. The reference image memory 106 stores the decoded image generated by the addition unit 105 as a reference image.

The prediction unit 107 generates a prediction image P for each of blocks generated by partitioned each frame of the viewpoint image T using a reference image stored in the reference image memory 106. The prediction unit 107 selects one of a plurality of prediction systems and generates a prediction image P using the selected prediction system. A method for selecting a prediction system is to, for example, select a prediction system that minimizes the difference between the prediction image P and the viewpoint image T. However, the method for selecting a prediction system is not limited to this and another method may be used. The prediction unit 107 also reports block information Ib indicating the block size of each of the above blocks to the prediction vector generation unit 110.

When the viewpoint image T is a base viewpoint image (also referred to as a base view), the above-described plurality of prediction systems to be selected are intra-prediction and motion prediction. When the viewpoint image T is a non-base viewpoint image (also referred to as a non-base view), the above-described plurality of prediction systems to be selected are intra-prediction, motion prediction, and disparity prediction.

Intra-prediction is a prediction system that uses a frame to which a target block belongs as a reference image during generation of a prediction image P. When selecting intra-prediction, the prediction unit 107 reports the prediction mode used to generate the prediction image P to the entropy encoding unit 103.

Motion prediction (also referred to as motion compensation) is a prediction system that uses a frame different from the frame to which the target block belongs among the viewpoint image T to which the target block belongs, as a reference image during generation of a prediction image P. When having selected motion prediction, the prediction unit 107 reports a motion vector Mv used to generate the prediction image P to the vector memory 109 and the subtraction unit 108. The motion vector Mv includes information indicating the vector from the coordinates of the target block to the coordinates in the reference image of the block specified as the prediction image P and information (for example, ref index (reference picture number) or picture order count (POC) (display order of pictures)) indicating the frame specified as the reference image.

Disparity prediction (also referred to as disparity compensation) is a prediction system that uses a frame having the same display order (the same POC) in the frame to which a target block belongs among frames of the viewpoint images T different from the viewpoint image T to which the target block belongs, as a reference image during generation of a prediction image P. When having selected disparity prediction, the prediction unit 107 reports the disparity vector Dv used to generate the prediction image P to the vector memory 109 and the subtraction unit 108. The disparity vector Dv includes information indicating the vector from the coordinates of the target block to the coordinates in the reference image of the block specified as the prediction image P and information (for example, ref index (reference picture number) or view_id (view identifier)) indicating the frame specified as the reference image.

The base viewpoint image is a viewpoint image T for which disparity prediction cannot be used during encoding and the non-base viewpoint image is a viewpoint image T for which disparity prediction can be used during encoding. For example, the image encoding device 100 assumes the viewpoint image T first input to the image encoding device 100 to be the base viewpoint image among a plurality of viewpoint images T and the other viewpoint images T to be non-base viewpoint images. In the present embodiment, a plurality of viewpoint images T include only one base viewpoint image. In the disparity prediction of a non-base viewpoint image, the base viewpoint image and the non-base viewpoint image that has been encoded are specified as reference images.

The subtraction unit 108 subtracts a prediction vector Pv generated by the prediction vector generation unit 110 from the motion vector Mv or the disparity vector Dv reported from the prediction unit 107 and reports the difference vector Δv resulting from the subtraction to the entropy encoding unit 103. The subtraction unit 108 includes, in the difference vector Δv, information indicating the frame specified as the reference image included in the motion vector Mv or the disparity vector Dv. The vector memory 109 stores the motion vector Mv and the disparity vector Dv reported from the prediction unit 107.

The prediction vector generation unit 110 generates a prediction vector Pv of the motion vector for the block for which the prediction unit 107 has generated a prediction image by selecting motion prediction. The prediction vector generation unit 110 selects one of a plurality of candidate vectors and uses the selected candidate vector as the prediction vector Pv and reports the index idx indicating the selected candidate vector to the entropy encoding unit 103. A known generation method can be used to generate the prediction vector Pv of the motion vector.

The prediction vector generation unit 110 generates a prediction vector Pv of the disparity vector for the block for which the prediction unit 107 has generated a prediction image by selecting disparity prediction. The prediction vector generation unit 110 selects one of a plurality of candidate vectors and uses the selected candidate vector as the prediction vector Pv and reports the index idx indicating the selected candidate vector to the entropy encoding unit 103. The generation method for the prediction vector Pv of the disparity vector and details on the index idx will be described later.

The depth map encoding unit 121 generates a depth map encoded stream De by encoding the depth map D corresponding to each frame of the viewpoint image T. The depth map encoding unit 121 also generates a decoded depth map Dd by decoding the depth map encoded stream De during generation of the depth map encoded stream De. The depth map memory 122 records the decoded depth map Dd generated by the depth map encoding unit 121.

The size of the depth map D and the decoded depth map Dd may be the same (number of pixels) as that of the viewpoint image or may be a half, quarter, one-eighth, or the like of that of the viewpoint image.

Figure 3:
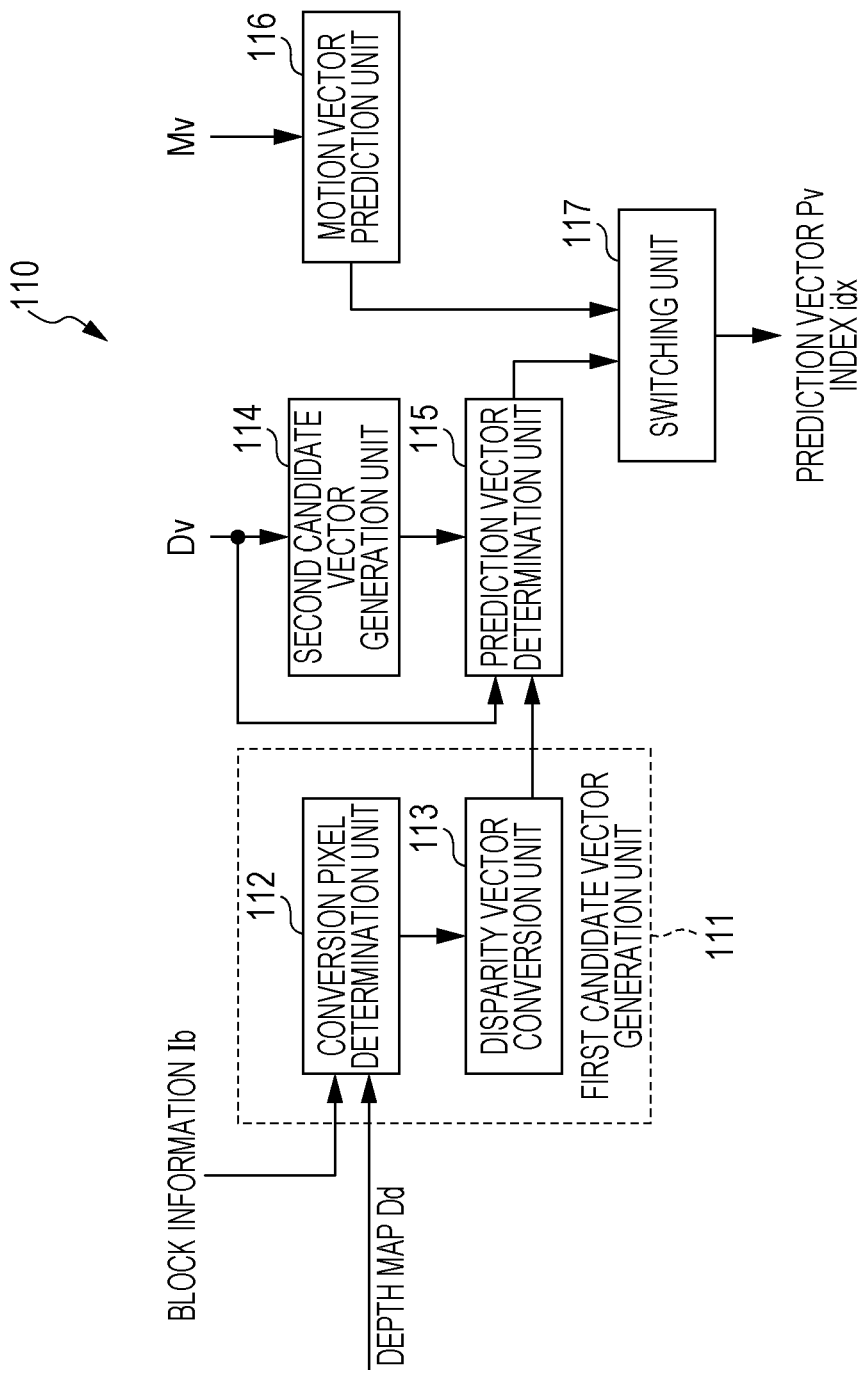
FIG. 3 is a block diagram schematically showing the structure of a prediction vector generation unit 110 according to the embodiment.

FIG. 3 is a block diagram schematically showing the structure of the prediction vector generation unit 110. As shown in FIG. 3, the prediction vector generation unit 110 includes a first candidate vector generation unit 111, a second candidate vector generation unit 114, a prediction vector determination unit 115, a motion vector prediction unit 116, and a switching unit 117. The first candidate vector generation unit 111 includes the conversion pixel determination unit 112 and the disparity vector conversion unit 113.

The conversion pixel determination unit 112 selects a determination rule for pixel positions in a block (referred to below as a depth block) in the decoded depth map Dd corresponding to the target block based on the block information Ib acquired from the prediction unit 107, and inputs the pixel positions determined in accordance with the selected determination rule in the disparity vector conversion unit 113. The block information Ib includes the size (width and height) of the block and the upper left coordinates of the block. The block size is the size of a prediction block (prediction unit (PU)).

When the depth map is reduced to 1/DN (DN=2^dn-fold) of the viewpoint image, if the upper left coordinates of the block is (x, y) and the size of the block is nPW and nPH, then coordinates (x0, y0) of the depth block and the size w and h can be derived by the following expressions.

$$x0 = x >> dn$$

$$y0 = x >> dn$$

$$w = nPW >> dn$$

$$h = nPH >> dn \quad (\text{``>>''} \text{ indicates a right shift.})$$

<Exemplary Structure Using a Selection Rule that Depends on the Block Size>

The conversion pixel determination unit 112 selects the determination rule of pixel positions in the block (referred to below as a depth block) in the decoded depth map Dd corresponding to the target block based on the block information Ib acquired from the prediction unit 107, and inputs the pixel positions determined in accordance with the selected determination rule in the disparity vector conversion unit 113. More specifically, the determination rule is selected so that a larger block size indicated by the block information Ib is associated with a smaller ratio of the number of determined pixel positions to the number of pixels in the depth block. As described later, the disparity vector conversion unit 113 specifies the depth values of pixel positions determined by the conversion pixel determination unit 112 as the depth values used for conversion from the decoded depth map Dd to the disparity vector.

In an exemplary structure of the conversion pixel determination unit 112, the conversion pixel determination unit 112 selects the determination rule depending on whether the block size indicated by the block information Ib is larger than the preset threshold of a block size (number of pixels). In the determination rule selected when the block size is larger, even-numbered pixel positions in the depth block in both the horizontal direction and the vertical direction are determined. In the determination rule selected when the block size is not larger, all pixel positions (or one point) in the depth block are determined. In this example, the pixel position in the upper left corner of the depth block is specified as the 0th position in both the vertical direction and the horizontal direction.

Figure 4:
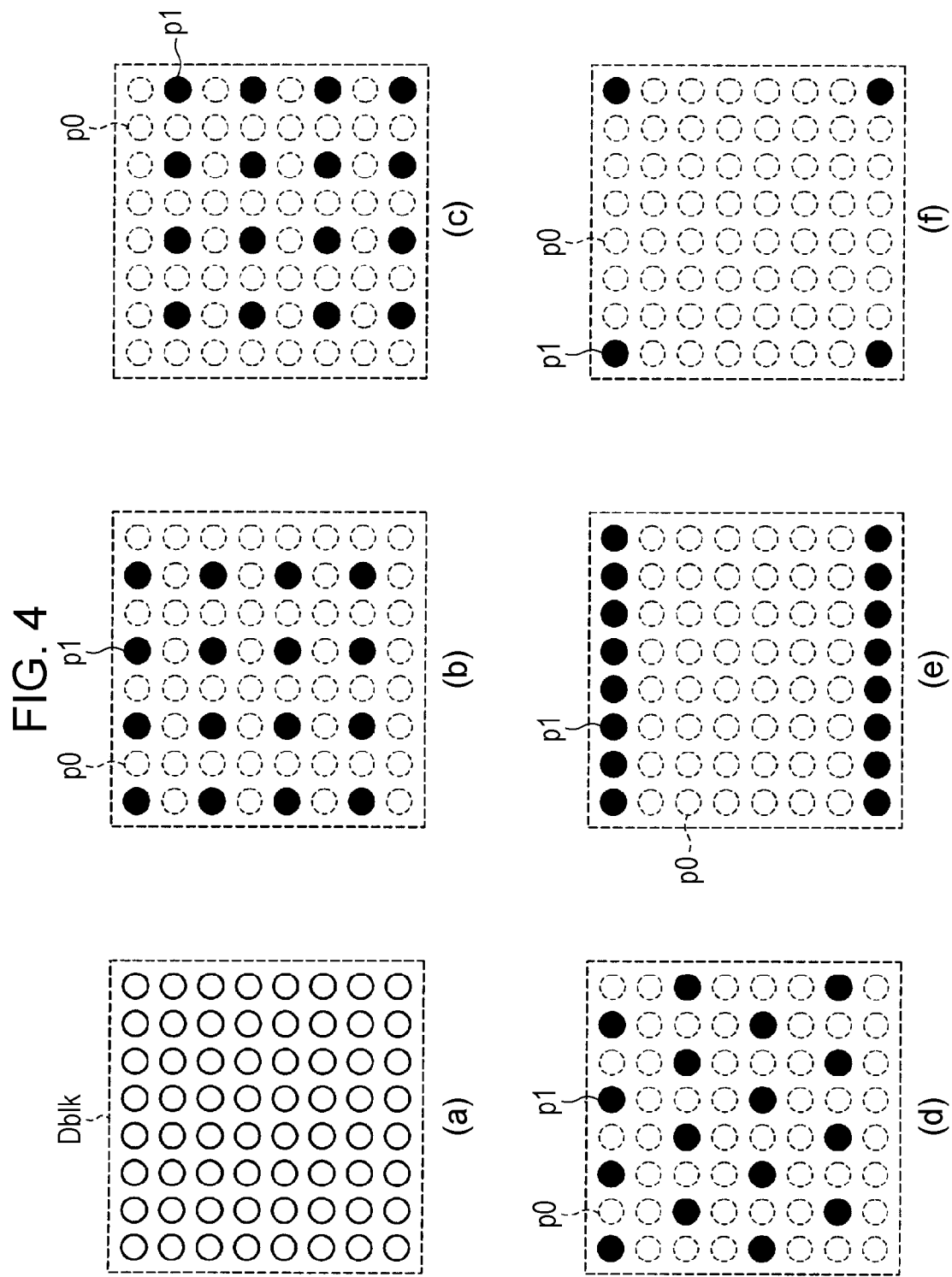
FIG. 4 shows an example of the positions of depth values (pixels) to be converted into a disparity vector in a conversion pixel determination unit 112 according to the embodiment.

An example in which the vertical and horizontal resolutions of a depth map are a quarter of those of a viewpoint image will be described. It is assumed that, for example, the size of a predicted target block is 32 pixels×32 pixels and the size of block Dblk (referred to below as a depth block) in the depth map corresponding thereto is 8 pixels×8 pixels as shown in FIG. 4(a). In this case, when the block size (32 pixels×32 pixels) indicated by the block information Ib is referenced, this size is larger than the preset threshold (for example, 16 pixels×16 pixels) of a block size. Accordingly, the conversion pixel determination unit 112 determines the even-numbered positions (that is, the positions of pixels p1 indicated by black circles in FIG. 4(b)) in both the vertical direction and the horizontal direction to be the pixel positions to be converted into a disparity vector instead of the all depth values shown in FIG. 4(a). In contrast, when the size is equal to or less than the preset threshold of a block size, one predetermined point is determined to be the pixel position to be converted into a disparity vector. The one predetermined point is the upper left coordinates. The conversion pixel determination unit 112 reports the determined pixel position to the disparity vector conversion unit 113.

The disparity vector conversion unit 113 calculates the average values Dave of the depth values of the pixel positions input by the conversion pixel determination unit 112 and converts the average value Dave into a disparity vector. The disparity vector conversion unit 113 inputs the converted disparity vector to the prediction vector determination unit 115. When the conversion pixel determination unit 112 has the structure as described in the above example, if the block size of the target block is larger than the threshold, the conversion pixel determination unit 112 inputs only the pixel positions of pixels p1 in the disparity vector conversion unit 113. Accordingly, the disparity vector conversion unit 113 does not use the depth values of pixels p0, which are pixels at pixel positions not input, for disparity vector conversion. This can reduce the amount of computation in disparity vector conversion.

Although the disparity vector conversion unit 113 converts the average value Dave of depth values into a disparity vector in this example, the median value, mode value, minimum value, maximum value, or the like may be converted into a disparity vector. In particular, when the order of the amount of computation during calculation is larger than $O(n)$ (n is the number of pieces of data) in the case of the median value or the like (for example, $O(n^2)$ or $O(n \log n)$), if pixel positions are limited when the block size is large, effects on the reduction of the amount of computation are large as described above.

In the example in FIG. 4(b), half of pixels in both the horizontal direction and the vertical direction in the block are used and only even-numbered pixel positions are targeted. However, the determination rule for the conversion pixel determination unit 112 is not limited to this example. For example, a determination rule for targeting only odd-numbered pixel positions in the horizontal direction and the vertical direction as shown in FIG. 4(c), a determination rule for targeting even-numbered positions and odd-numbered positions alternately for each pixel row as shown in FIG. 4(d), a determination rule for targeting only the top row and the bottom row in the block as shown in FIG. 4(e), and a determination rule for targeting only the pixels at the four corners of the block as shown in FIG. 4(f) are allowed. Alternatively, half of the pixels in the horizontal direction and the vertical direction in the original depth block are targeted in FIGS. 4(b) to 4(d), but a quarter, one-eighth, or another ratio of the pixels may be targeted. At this time, the number of pixels in the horizontal direction may be different from the number of pixels in the vertical direction.

When the conversion pixel determination unit 112 selects target pixels using fixed N points (N=2^n, n=2 in this case) in the block as in the method shown in FIG. 4(f), the conversion pixel determination unit 112 can select target pixels using constant processing regardless of the block size. In this case, since loop processing that depends on the block size is not necessary, processing such as initialization of loop variables, determination of loop termination, and updating of loop variables is not necessary, thereby enabling reduction in the amount of processing. In particular, when the block size is small, loop overhead is greater relative to the number of target points. When the block size is small, the number of blocks to be processed is large, significantly reducing latency. In addition, the amount of processing can also be reduced by a method that uses one fixed point when the block size is equal to or less than a predetermined size. Reduction in loops makes the implementation accompanying loops unnecessary, thereby facilitating implementation.

In the specific example shown below, the target pixels are selected by fixed N points (N=2^n, n=2 in this case) in a block and the disparity vector conversion unit 113 calculates the maximum value Dmax based on the depth values of the selected pixels.

$D$max=depth[$x0$]/[$y0$]

if ($D$max>depth[$x0+w-1$]/[$y0$]+depth) $D$max=depth[$x0+w-1$][$y0$]

if ($D$max>depth[$x0$]/[$y0+h-1$]+depth) $D$max=depth[$x0+w-1$]/[$y0+h-1$]

if ($D$max>depth[$x0+w-1$]/[$y0+h-1$]+depth) $D$max=depth[$x0+w-1$]/[$y0+h-1$]

The number of branches used to determine the maximum value is fixed in this case, thereby not only making loops unnecessary as described above but also facilitating implementation.

<Exemplary Structure Using a Selection Rule that does not Depend on the Block Size>

Although the conversion pixel determination unit 112 determines the target pixels based on the block information Ib in the above example, the target pixels during conversion from the depth block into a disparity vector may be determined as described above regardless of the block information Ib. That is, half of the pixels in the horizontal direction and the vertical direction in the depth block may be selected and converted into a disparity vector regardless of the size of the target block.

At this time, for the horizontal direction and the vertical direction, either even-numbered pixel positions or odd-numbered pixel positions may be selected, a half, a quarter, one-eighth, or the like of the pixels may be selected, or combination of either even-numbered pixel positions or odd-numbered pixel positions and a half, a quarter, one-eighth, or the like of the pixels may be selected. Alternatively, only the pixels at the four corners of the depth block may be selected. When the original size of the depth block is, for example, 1×2 or 2×2 and less than the number of pixels to be selected (that is, when a half, quarter, one-eighth, or the like of the pixels is less than one pixel) at this time, the pixel at the specific position (for example, the upper left position) in the depth block is selected as the target pixel.

Figure 5:
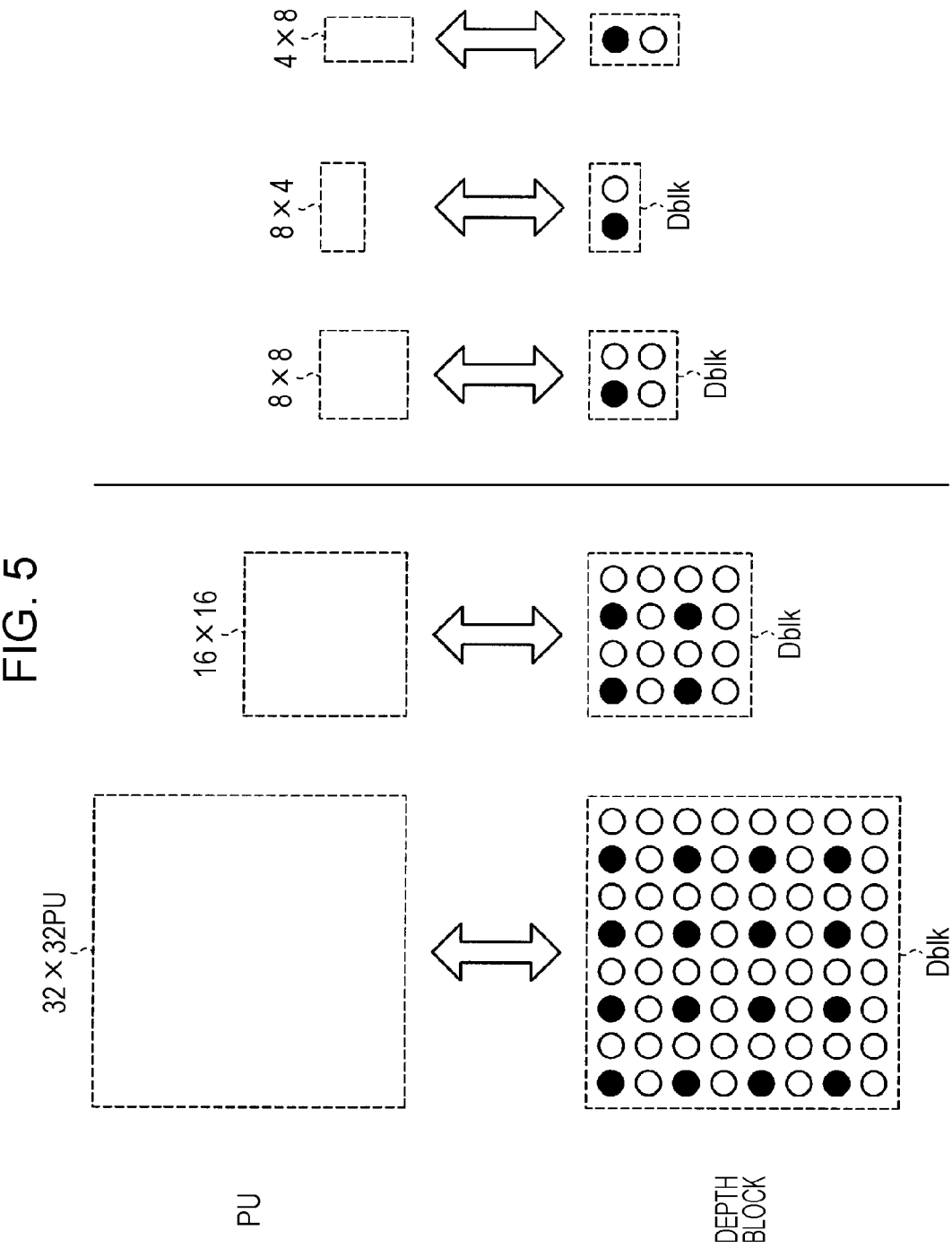
FIG. 5 shows an example of a block size and a selection method for pixels by the conversion pixel determination unit 112 according to the embodiment.

In one exemplary structure of the conversion pixel determination unit 112, half of the pixels in the horizontal direction and the vertical direction in the block are used for all block sizes as shown in FIG. 4(b) described above. FIG. 5 shows the cases in which the block size is 32×32, 16×16, 8×8, 8×4, and 4×8. At this time, the sizes of the corresponding depth blocks are 8×8, 4×4, 2×2, 2×1, and 1×2, respectively. The selected pixels are determined by subsampling half of the pixels in the horizontal direction and the vertical direction in each depth block.

When the conversion pixel determination unit 112 selects pixels at sample intervals st and the disparity vector conversion unit 113 calculates the average value Dave based on the depth values of the selected pixels, the average value is calculated by the following expression.

```
sum = 0;
shift = log2(w*h)
for (j = y0; j < y0 + w; j+=st) {
    for (i = x0; i < x0 + w; i+=st) {
        sum += depth[i][j]
    }
}
Dave=sum >> shift
```

Where depth[x][y] is the depth value at coordinates (x, y), x0 and y0 are the upper left coordinates of the block, w is the width of the block, and h is the height of the block. When all pixels in the depth block are used, st=1 holds. When st>1, pixels in the depth block are sampled. The term log 2 is base-2 logarithm.

Figure 6:
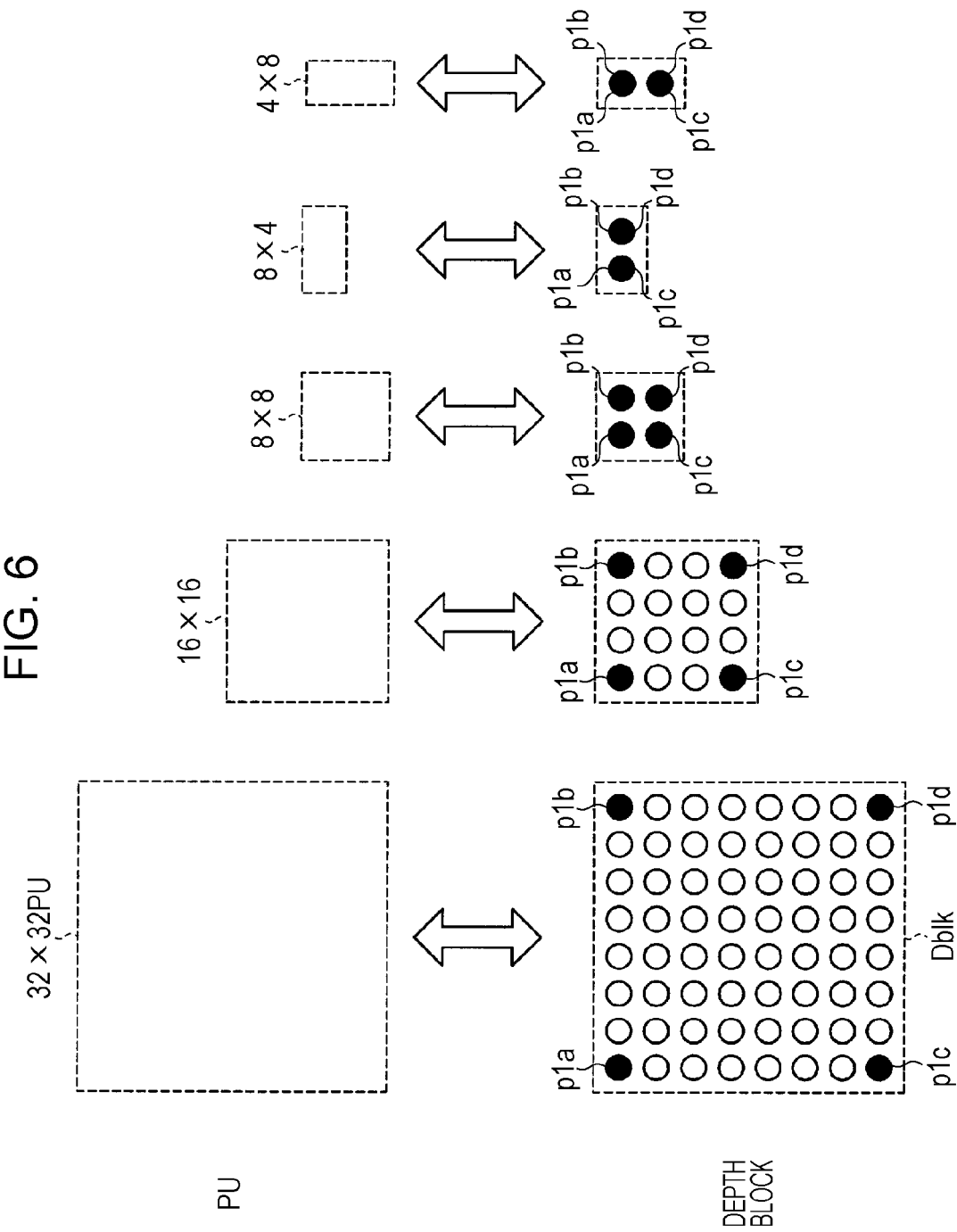
FIG. 6 shows another example of the block size and the selection method for pixels by the conversion pixel determination unit 112 according to the embodiment.

In another exemplary structure of the conversion pixel determination unit 112, the pixels in the four corners of the block are used as shown in FIG. 4(f) for all block sizes. FIG. 6 shows the case where the pixels in the four corners are used when the vertical and horizontal sizes of a depth map are a quarter of those of a disparity image. As shown in FIG. 6, the conversion pixel determination unit 112 references the four points: p1a, p1b, p1c, and p1d. When the block size is small, some of the points at the four corners represent the same point. That is, when the size is 8×4, p1a=p1c and p1b=p1d hold. When the size is 4×8, p1a=p1b and p1c=p1d hold. In this case, the conversion pixel determination unit 112 may have the structure for selecting four points regardless of the block size or the structure for selecting, for example, four points, two points, or one point depending on the block size so as to exclude the points having the same coordinates. When the disparity vector conversion unit 113 calculates the average value or the maximum value based on the depth values of the selected pixels, the result is the same regardless of whether the calculation is made using four points or two points. Since the fixed four points are used in this structure regardless of the block size, processing concerning loop processing can be omitted, thereby improving the processing speed and the easiness of implementation.

In a determination rule for associating a lager block size with a smaller ratio of the number of determined pixel positions to the number of pixels in the depth block as shown in FIGS. 4(e) to 4(f), it is possible to reduce the amount of computation in disparity vector conversion of the target block with a large block size without using the block information Ib.

<Exemplary Structure Using Another Selection Rule that Depends on the Block Size>

The conversion pixel determination unit 112 may use a determination rule other than the above. More specifically, when the block size indicated by the block information Ib is equal to or more than a predetermined size, the conversion pixel determination unit 112 uses a predetermined sampling rule as the determination rule. When the block size is less than the predetermined size, the conversion pixel determination unit 112 selects a determination rule so that the number of determined pixel positions is 1. When the block size is equal to or less than the predetermined size at this time, only one point is used. Accordingly, as in the case where the block size is large, it is possible to reduce the amount of processing for a small block size that particularly requires small latency.

One exemplary structure of the conversion pixel determination unit 112 will be described with reference to FIG. 5 again. As FIG. 5 shows, when block size is equal to or less than a predetermined size in ½ sampling (in the case of 8×8, 8×4, or 4×8 in this example), the structure has only one point. This structure can also be achieved by a method branching depending on the block size. In the structure in which a branch is performed explicitly, when, for example, the maximum values of the width and height of the block size is 8 or less, one point is used. Otherwise, sampling with a loop is performed. Since loop processing can be omitted when a branch depending on the block size is performed, the processing speed can be improved.

Figure 7:
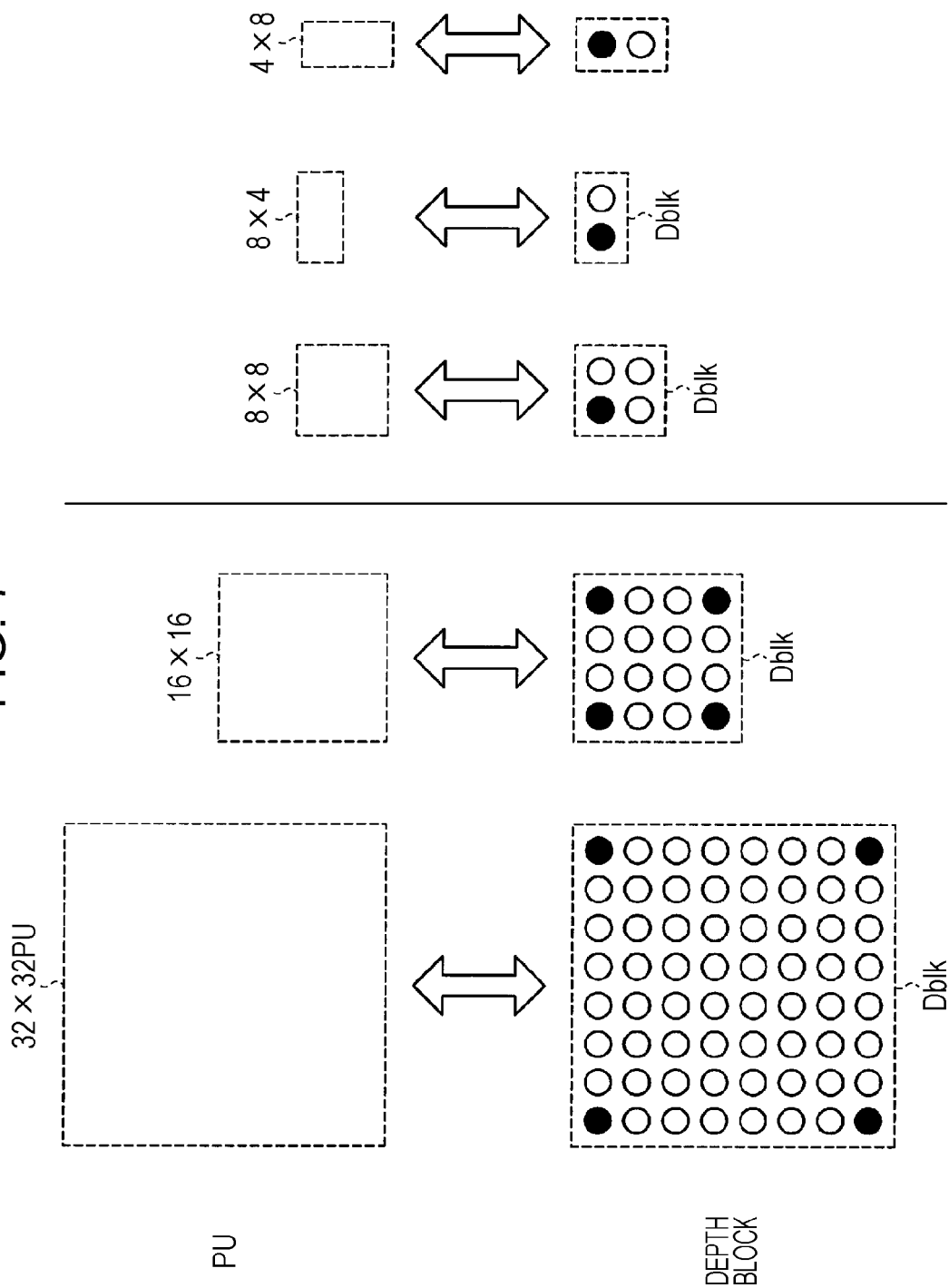
FIG. 7 shows still another example of the block size and the selection method for pixels by the conversion pixel determination unit 112 according to the embodiment.

In another exemplary structure of the conversion pixel determination unit 112, the pixels in the four corners of the block are used as shown in FIG. 4(f) for all block sizes. FIG. 7 shows an exemplary structure in which the four corners are used when the block size is equal to or more than a predetermined block size and one point is used in the other cases. That is, one point is used when the maximum values of the width and height of the block size is equal to or less than 8 and the four corners are used on the other cases.

Since fixed points are used in this case regardless of the block size, loop processing can be omitted. In addition, since the number of points for a small-sized block is 1, the processing speed for a small-sized block can be further improved.

The second candidate vector generation unit 114 reads the disparity vector Dv owned by an adjacent block of the target block from the vector memory 109. The second candidate vector generation unit 114 reports the read disparity vector Dv to the prediction vector determination unit 115 as a second candidate vector. In the present embodiment, a disparity vector is read for one of the blocks adjacent to the left side and one of the blocks adjacent to the upper side and a maximum of two second candidate vectors are generated. When no disparity vector is present in an adjacent block, no candidate vector is generated for the adjacent block. FIG. 8(a) shows the relationship between a target block and adjacent blocks. The adjacent blocks for target block PU for which disparity vectors are read are blocks NBa0, NBa1, NBb0, NBb1, and NBb2 in the drawing. Of these blocks, the disparity vector of each of blocks NBa0 and NBa1 adjacent to the left side of the target block is referenced in the order of blocks NBa0 and NBa1 and these vectors are integrated into one candidate vector. Similarly, the disparity vector of each of blocks NBb0, NBb1, and NBb2 adjacent to the upper side of the target block is referenced in the order of blocks NBb0, NBb1, and NBb2 and these vectors are integrated into one candidate vector. Although the present embodiment assumes that the maximum number of second candidate vectors is two, the maximum number may be another number.

The prediction vector determination unit 115 selects the first candidate vector or the second candidate vector, whichever has a less difference with the disparity vector of the target block, and specifies it as the prediction vector Pv. The prediction vector determination unit 115 generates an index idx indicating either the first candidate vector or the second candidate vector has been selected as the prediction vector. The first candidate vector generation unit 111, the second candidate vector generation unit 114, and the prediction vector determination unit 115 operate only when the prediction image of the target block has been generated by disparity prediction.

The motion vector prediction unit 116 generates the prediction vector of a motion vector and an index idx. The motion vector prediction unit 116 may use a known method to generate a prediction vector. For example, the motion vector prediction unit 116 reads the motion vectors of a plurality of blocks adjacent to the target block from the vector memory 109 and sequentially specifies the read motion vectors as candidate vectors depending on the positions of the adjacent blocks.

The motion vector prediction unit 116 selects a vector with a small difference with the motion vector of the target block from a plurality of candidate vectors and specifies it as the prediction vector Pv. The motion vector prediction unit 116 generates an index idx indicating which vector has been specified as the prediction vector from a plurality of candidates. The motion vector prediction unit 116 operates only when the prediction image of the target block has been generated by motion prediction.

When the prediction vector Pv and the index idx are input from the prediction vector determination unit 115 or the motion vector prediction unit 116, the switching unit 117 reports the input prediction vector Pv and the index idx to the entropy encoding unit 103.

Figure 9:
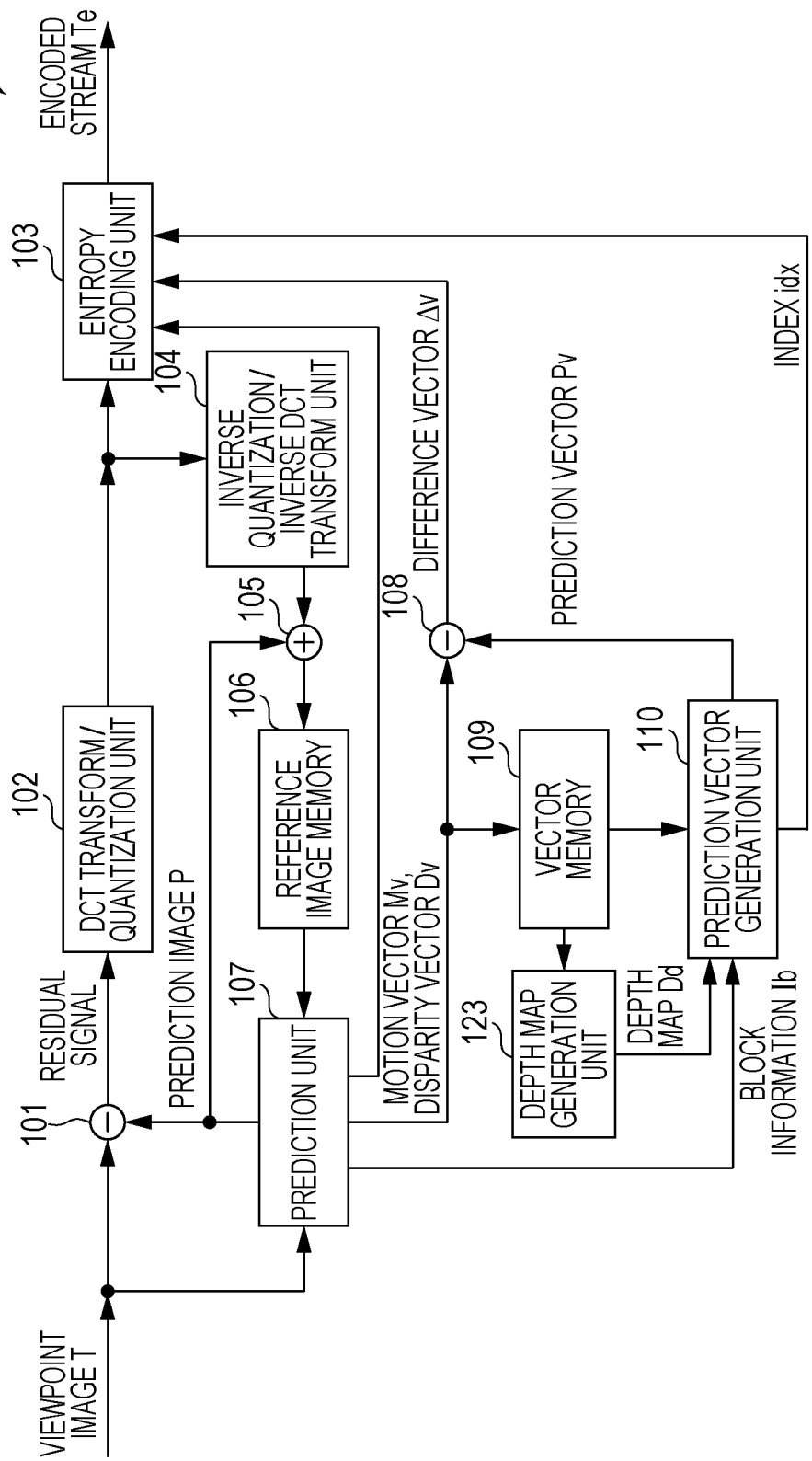
FIG. 9 is a block diagram schematically showing the structure of another image encoding device 100a according to the embodiment.

Next, another exemplary structure of an encoding device will be described. FIG. 9 is a block diagram schematically showing the structure of another image encoding device 100a according to the present embodiment. The image encoding device 100a is different from the image encoding device 100 in that the image encoding device 100a has a depth map generation unit 123 in place of the depth map encoding unit 121 and the depth map memory 122.

The depth map generation unit 123 reads a disparity vector from the vector memory 109 and generates a pseudo depth map. The depth values included in the depth map are generated by performing the inverse transform of the conversion from a depth map into a disparity vector, as described above. The size (number of pixels) of a depth map to be generated is determined in accordance with the number of acquired disparity vectors. The missing pixels may be acquired by copying adjacent pixels or by compensation using a plurality of nearby pixels so as to match the size of the viewpoint image. Alternatively, a depth map with a size half, quarter, one-eighth, or the like of the size of the viewpoint image may be created. The depth map generation unit 123 also generates the depth values of the target block by copying them from adjacent pixels or by compensation using a plurality of nearby pixels.

The other components included in the image encoding device 100a are the same as those of the image encoding device 100. In this structure, even when a depth map is not given externally, a disparity prediction vector can be generated using the prediction vector generation unit 110 as in the image encoding device 100 by generating a pseudo depth map.

Figure 10:
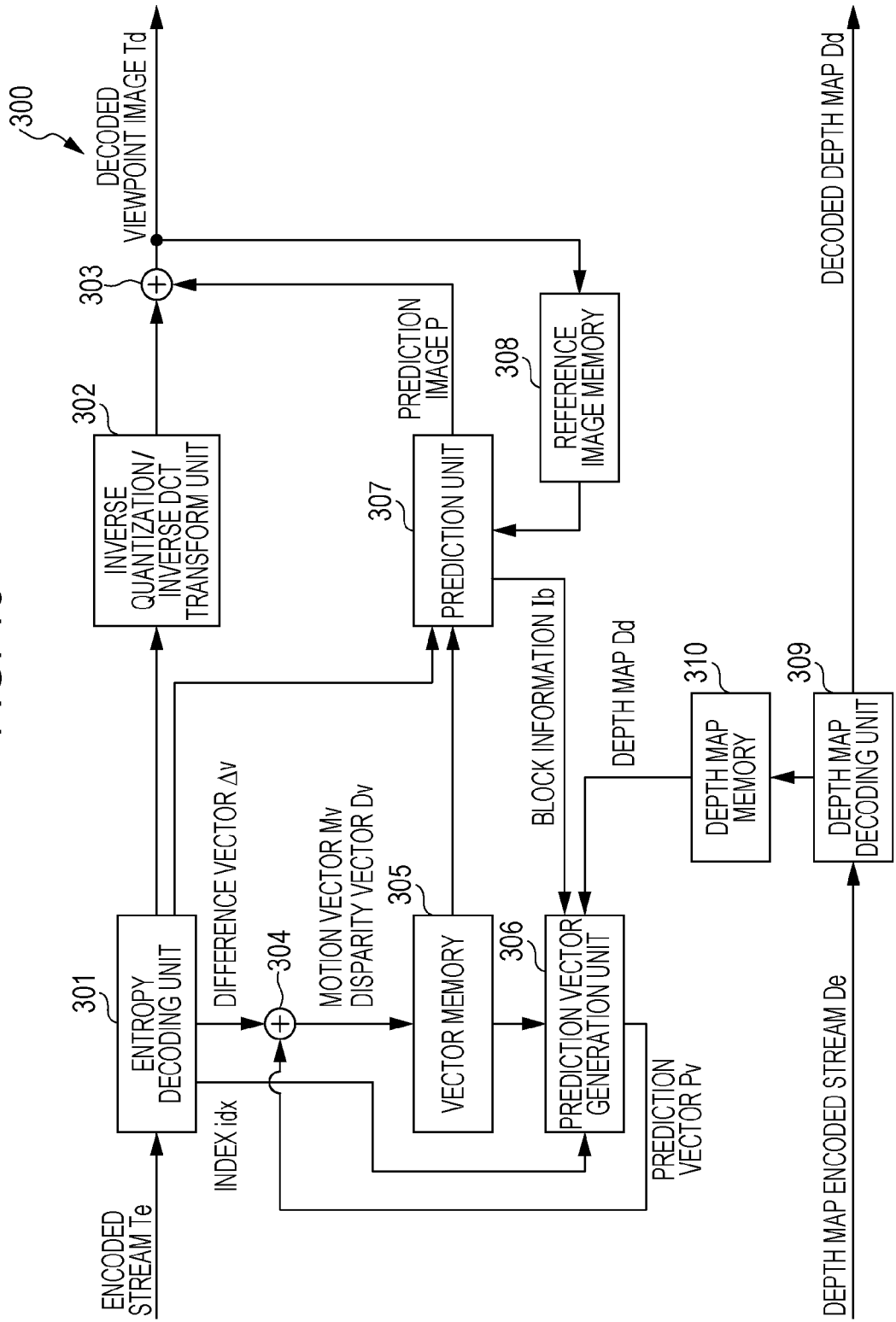
FIG. 10 is a block diagram schematically showing the structure of an image decoding device 300 according to the embodiment.

FIG. 10 is a block diagram schematically showing the structure of the image decoding device 300. As shown in FIG. 10, the image decoding device 300 includes an entropy decoding unit 301, an inverse quantization/inverse DCT transform unit 302, an addition unit 303, an addition unit 304, a vector memory 305, a prediction vector generation unit 306 (prediction vector generation device), a prediction unit 307, a reference image memory 308, a depth map decoding unit 309, and a depth map memory 310.

The entropy decoding unit 301 performs the decoding corresponding to the encoding system in the entropy encoding unit 103 in FIG. 2 on the encoded stream Te. The entropy decoding unit 301 separates the index idx, the difference vector Δv, the quantization coefficient, and the prediction mode from the result of the decoding. The inverse quantization/inverse DCT transform unit 302 performs processing similar to that of the inverse quantization/inverse DCT transform unit 104 in FIG. 2 on the quantization coefficient separated by the entropy decoding unit 301 to generate a decoded residual signal. The addition unit 303 adds the decoded residual signal generated by inverse quantization/inverse DCT transform unit 302 to the prediction image P generated by the prediction unit 307 to generate a decoded viewpoint image Td.

The addition unit 304 adds the difference vector Δv separated by the entropy decoding unit 301 to the prediction vector Pv generated by the prediction vector generation unit 306 to generate a motion vector Mv or the disparity vector Dv. The addition unit 304 stores the generated motion vector Mv and disparity vector Dv in the vector memory 305.

The prediction vector generation unit 306 generates a prediction vector Pv with reference to the index idx separated by the entropy decoding unit 301, the vectors stored in the vector memory 305, and the decoded depth map Dd stored in the depth map memory 310. Details on the prediction vector generation unit 306 will be described later.

The prediction unit 307 generates the prediction images P of the blocks generated by partitioning the viewpoint image T. The prediction unit 307 generates the prediction images P of the blocks using the same prediction system as in the prediction unit 107 in FIG. 2. The reference image used to generate the prediction images P is acquired from the reference image memory 308. The prediction unit 307 inputs the block information Ib, which indicates the block sizes of the blocks, to the prediction vector generation unit 306. For the blocks for which the prediction images P have been generated in the prediction unit 107 by intra-prediction, the prediction unit 307 performs intra-prediction in accordance with the prediction mode separated by the entropy decoding unit 301 to generate the prediction images P.

For the blocks for which the prediction images P have been generated by motion prediction in the prediction unit 107, the prediction unit 307 performs motion prediction using the motion vector Mv of the blocks stored in the vector memory 305 to generate the prediction images P. For the blocks for which the prediction images P have been generated by disparity prediction in the prediction unit 107, the prediction unit 307 performs disparity prediction using the disparity vector Dv of the blocks stored in the vector memory 305 to generate the prediction images P.

The reference image memory 308 stores the decoded viewpoint image Td generated by the addition unit 303 as a reference image. The depth map decoding unit 309 performs the decoding corresponding to the encoding system in the depth map encoding unit 121 in FIG. 2 on the depth map encoded stream De to generate a decoded depth map Dd. The depth map memory 310 stores the decoded depth map Dd generated by the depth map decoding unit 309.

Figure 11:
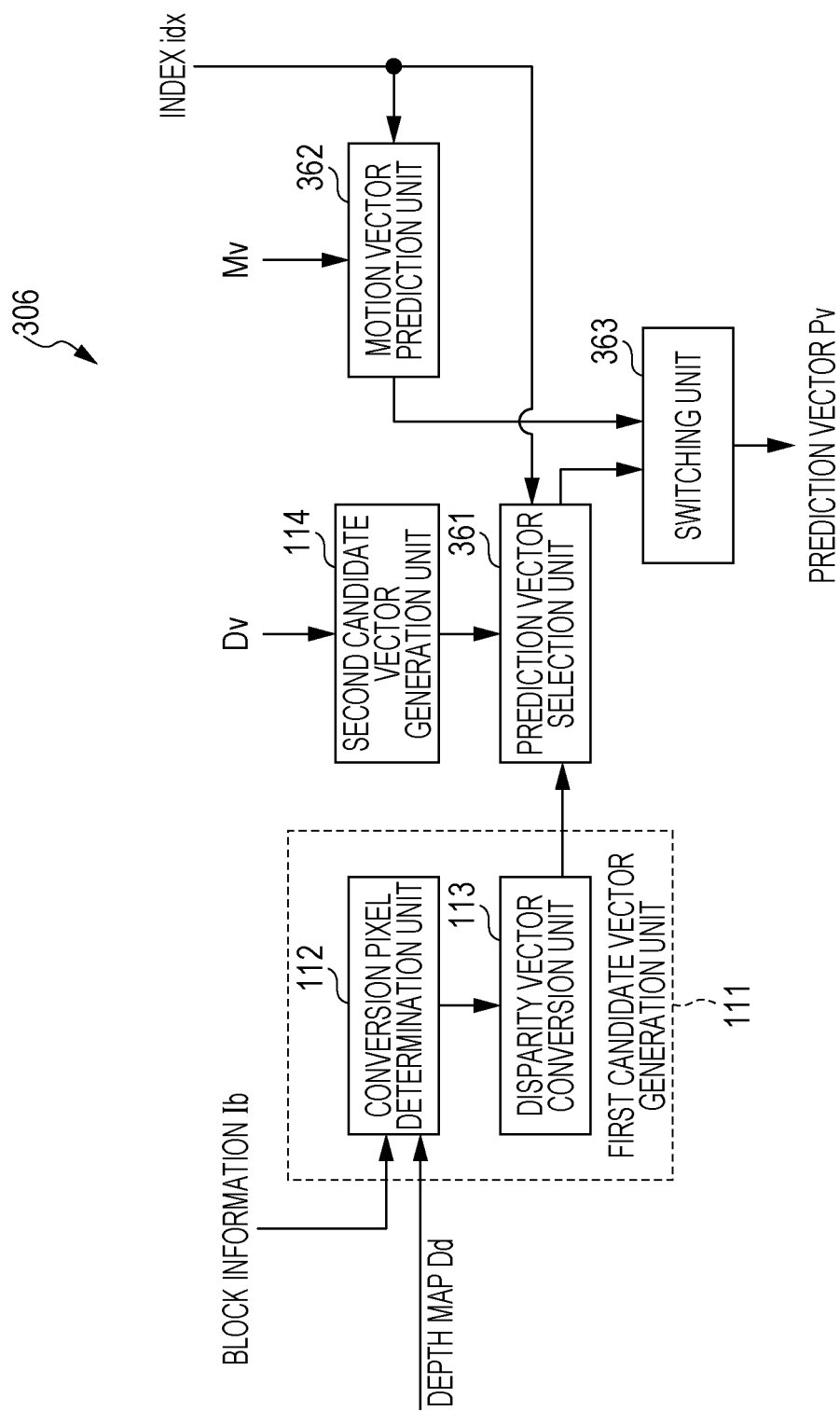
FIG. 11 is a block diagram schematically showing the structure of a prediction vector generation unit 306 according to the embodiment.

FIG. 11 is a block diagram schematically showing the structure of the prediction vector generation unit 306. As shown in FIG. 11, the prediction vector generation unit 306 includes a first candidate vector generation unit 111, a second candidate vector generation unit 114, a prediction vector selection unit 361, a motion vector prediction unit 362, and a switching unit 363. In FIG. 11, the components corresponding to those of the prediction vector generation unit 110 in FIG. 3 are given the same reference characters (111 to 114) and descriptions are omitted.

The prediction vector selection unit 361 selects the vector indicated by the index idx from the candidate vectors generated by the first candidate vector generation unit 111 and the candidate vectors generated by the second candidate vector generation unit 114. The motion vector prediction unit 362 generates candidate vectors as in the motion vector prediction unit 116 in FIG. 3 and selects the vector indicated by the index idx from these vectors. When the prediction system of a block is disparity prediction, the switching unit 363 outputs the vector selected by the prediction vector selection unit 361 as the prediction vector Pv. When the prediction system of a block is motion prediction, the switching unit 363 outputs the vector selected by the motion vector prediction unit 362 as the prediction vector Pv.

(Another Structure of the Decoding Device)

Figure 12:
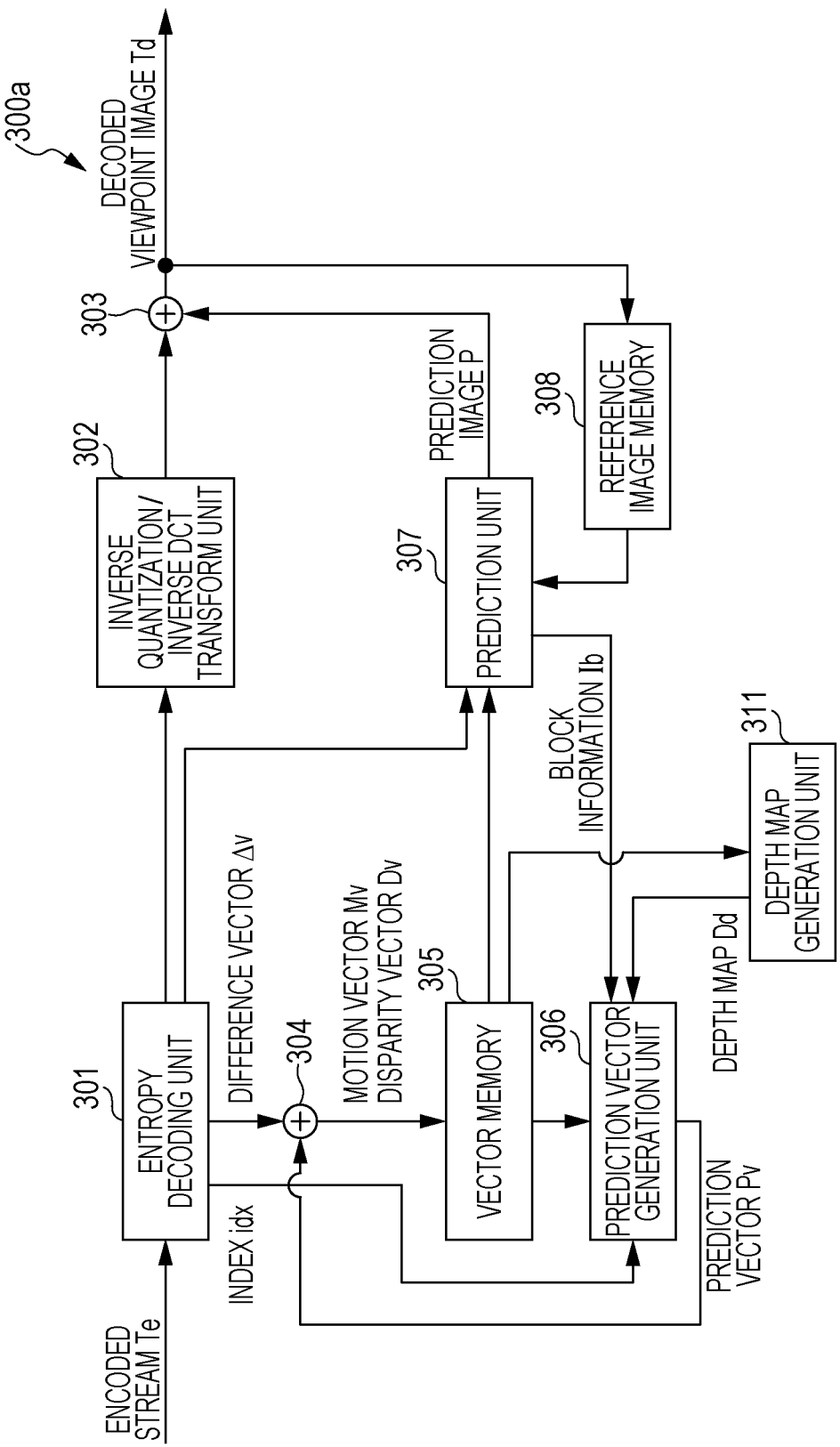
FIG. 12 is a block diagram schematically showing the structure of another image decoding device 300a according to the embodiment.

Next, another exemplary structure of the decoding device will be described. FIG. 12 is a block diagram schematically showing the structure of another image decoding device 300a according to the present embodiment. The image decoding device 300a is different from the image decoding device 300 in that the image decoding device 300a includes a depth map generation unit 311 in place of the depth map decoding unit 309 and the depth map memory 310.

The depth map generation unit 311 reads a disparity vector from the vector memory 305 and generates a pseudo depth map as in the depth map generation unit 123 in the image encoding device 100a. The depth values included in the depth map are generated by executing the inverse transform of the conversion from a depth map into a disparity vector, as described above. The size (number of pixels) of a depth map to be generated is determined in accordance with the number of acquired disparity vectors. The missing pixels may be acquired by copying adjacent pixels or by compensation using a plurality of nearby pixels so as to match the size of the viewpoint image. Alternatively, a depth map with a size half, quarter, one-eighth, or the like of the size of the viewpoint image may be created. The depth map generation unit 311 also generates the depth values of the target block by copying them from adjacent pixels or by compensation using a plurality of nearby pixels.

The other components included in the image decoding device 300a are the same as those of the image decoding device 300. In this structure, even when a depth map is not given externally, a disparity prediction vector can be generated using the prediction vector generation unit 306 as in the image decoding device 300 by generating a pseudo depth map.

As described above, in the present embodiment, a disparity prediction vector can be generated efficiently while suppressing increases in the amount of computation in encoding/decoding by generating a disparity vector using a part of pixels in the depth map.

Second Embodiment

A second embodiment of the present invention will be described with reference to the drawings. In the first embodiment, the prediction vector of a disparity vector is generated using a depth map input externally or a depth map generated from a viewpoint image. In the second embodiment, the prediction vector of a disparity vector is generated using information of blocks spatially or temporally adjacent to a target block without requiring a depth map.

Figure 13:
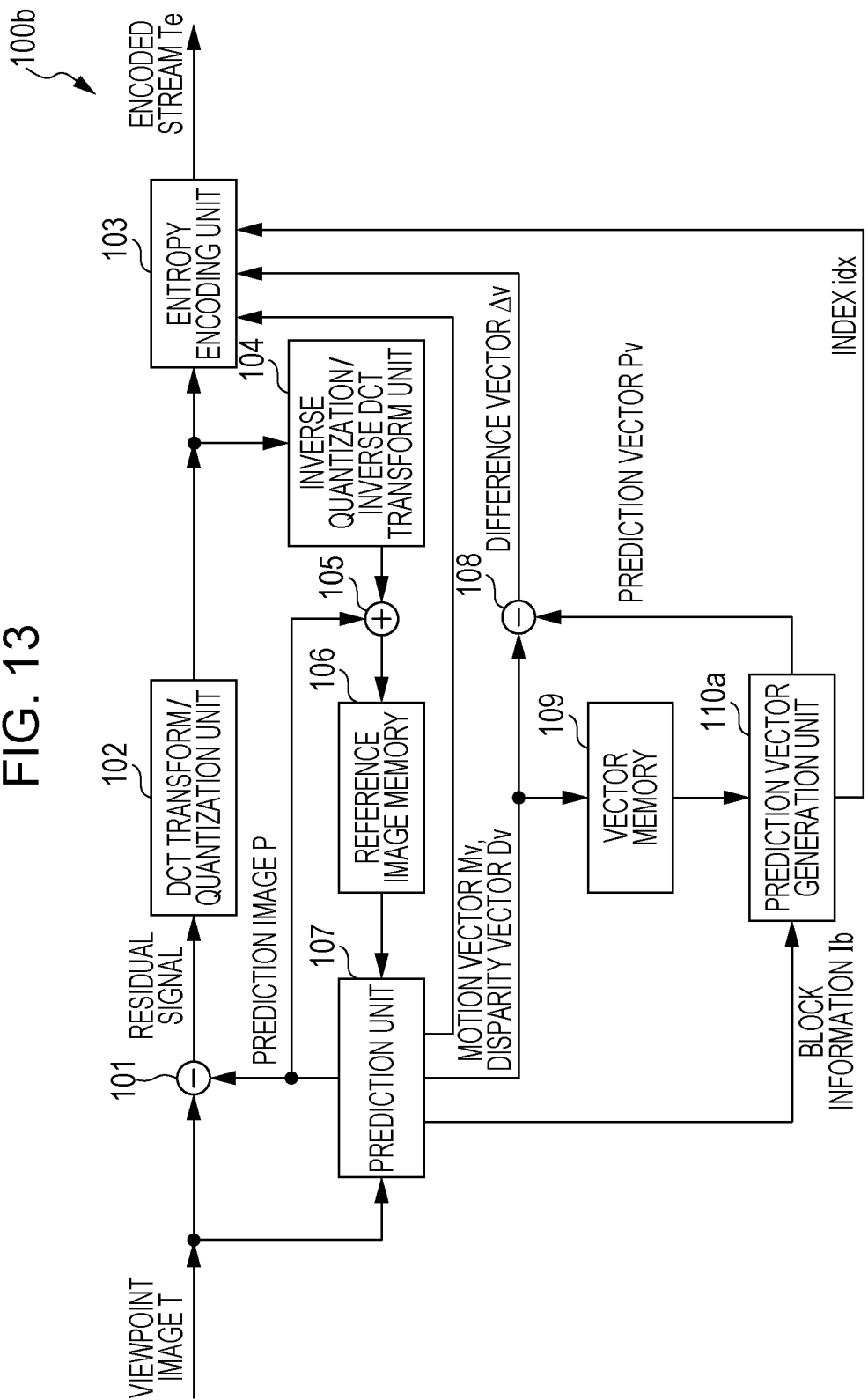
FIG. 13 is a block diagram schematically showing the structure of an image encoding device 100b according to a second embodiment of the present invention.

An image transmission system 10a according to the present embodiment includes the image encoding device 100a in place of the image encoding device 100 and the image decoding device 300a in place of the image decoding device 300. FIG. 13 is a block diagram schematically showing the structure of an image encoding device 100b. In FIG. 13, the components corresponding to those of the image encoding device 100 in FIG. 2 are given the same reference characters (101 to 109, 111, and 112) and descriptions are omitted. As shown in FIG. 13, the image encoding device 100b includes the subtraction unit 101, the DCT transform/quantization unit 102, the entropy encoding unit 103, the inverse quantization/inverse DCT transform unit 104, the addition unit 105, the reference image memory 106, the prediction unit 107, the subtraction unit 108, the vector memory 109, and a prediction vector generation unit 110a.

Figure 14:
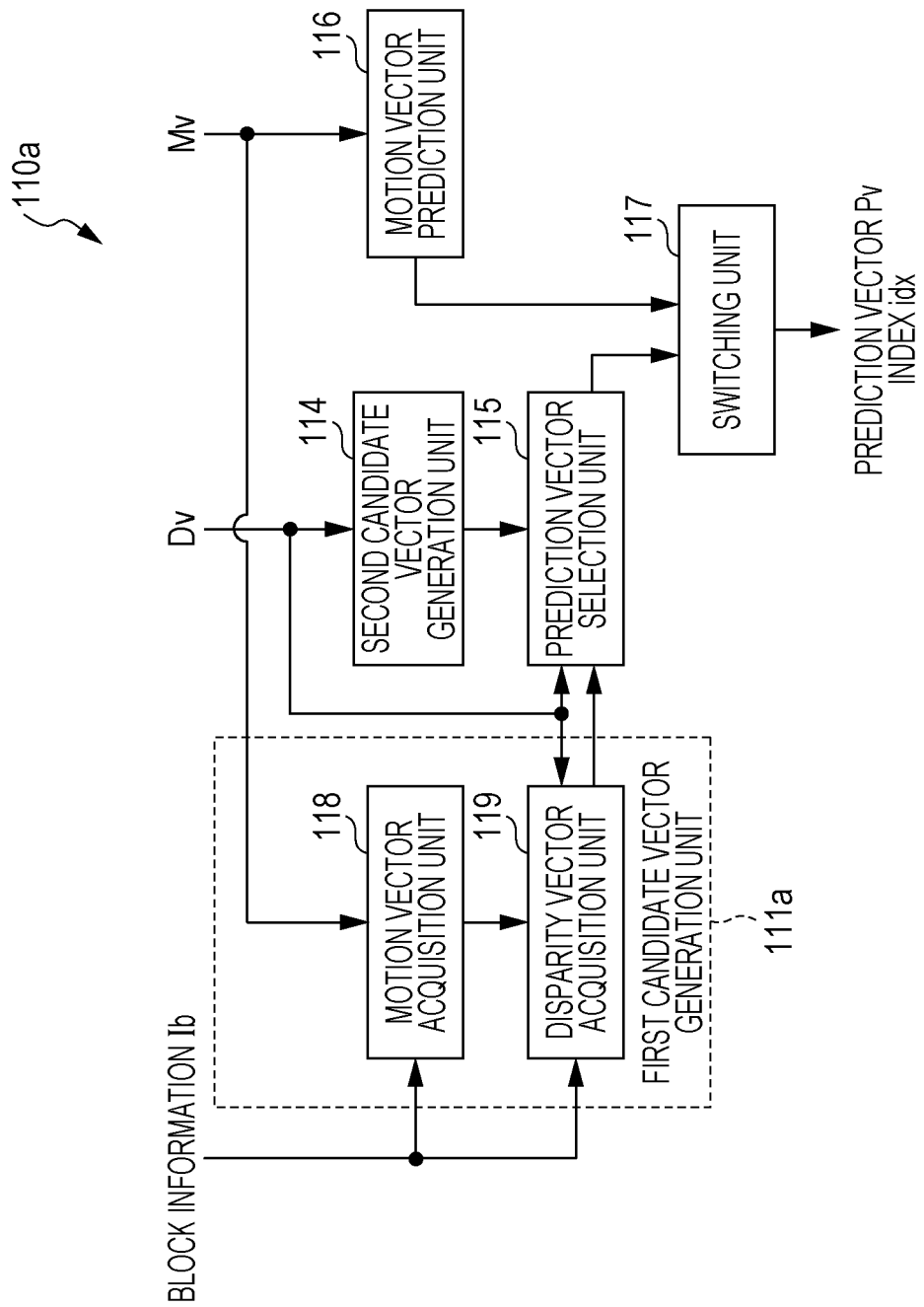
FIG. 14 is a block diagram schematically showing the structure of a prediction vector generation unit 110a according to the embodiment.

FIG. 14 is a block diagram schematically showing the structure of the prediction vector generation unit 110a. As show in FIG. 14, the prediction vector generation unit 110a includes a first candidate vector generation unit 111a, the second candidate vector generation unit 114, the prediction vector determination unit 115, the motion vector prediction unit 116, and the switching unit 117. The first candidate vector generation unit 111a includes a motion vector acquisition unit 118 and a disparity vector acquisition unit 119. In FIG. 14, the components corresponding to those in FIG. 3 are given the same reference characters (114 to 117) and descriptions are omitted.

The motion vector acquisition unit 118 acquires the motion vectors Mv of blocks with different viewpoints corresponding to the target block. FIG. 8(b) shows the blocks corresponding to the target block. The motion vector acquisition unit 118 checks the availability of a motion vector for block CLPU, included in an image (reference picture with temporally the same display order as a picture including the target block) with a different viewpoint from the viewpoint image including the target block, that is located in the same position as the target block, encoded unit block CLCU including block CLPU, and block BB adjacent to the lower right corner of block CLPU. As a result, if a motion vector is available, the motion vector is acquired. The acquisition of the motion vector is performed in the order shown above and, when a motion vector is acquired (in the first block including a motion vector that can be referenced), the acquisition of the vector is completed.

An encoded unit block is acquired by partitioning each frame into even-sized blocks, such as a largest coding unit (LCU) in High Efficiency Video Coding (HEVC). The block from which a prediction image is generated is the same as the encoded unit block or a block acquired by further partitioning the encoded unit block. The motion vector with respect to encoded unit block CLCU is a motion vector in one of blocks (blocks from which prediction images are generated) acquired by partitioning encoded unit block CLCU. That is, if any of blocks acquired by partitioning encoded unit block CLCU has a motion vector, it is acquired as a motion vector with respect to encoded unit block CLCU.

Generally, adjacent block BB is also a block in encoded unit block CLCU. In this case, if adjacent block BB has a motion vector, it is acquired as a motion vector with respect to encoded unit block CLCU. However, if block CLPU is located on the right side or at the bottom of encoded unit block CLCU in the case shown in FIG. 8(b), adjacent block BB is located outside encoded unit block CLCU, so a motion vector of adjacent block BB may be acquired even if a motion vector with respect to encoded unit block CLCU is not acquired.

In the motion vector acquisition unit 118 and the disparity vector acquisition unit 119, the motion vector and disparity vector of certain block X (block X is one of the above blocks) are referenced as described below. Whether block X is subject to inter-prediction is checked with reference to prediction mode predMode of block X or two prediction flags predFlagL0 and predFlagL1 of the block X. If prediction mode predMode is MODE_INTRA, intra-prediction is assumed. Otherwise, inter-prediction is assumed.

Prediction flags predFlagL0 and predFlagL1 indicate whether reference pictures belonging to reference list L0 and reference list L1 are used to create prediction pictures. When both predFlagL0 and predFlagL1 are 1, double prediction of inter-prediction is assumed. When either predFlagL0 or predFlagL1 is 1, single prediction of inter-prediction is assumed. When both predFlagL0 and predFlagL1 are 0, intra-prediction is assumed. If block X is not subject to inter-prediction, the motion vector and disparity vector of block X are not available. When prediction flag predFlagLX of reference list LX is 1, the reference picture used to create a prediction image is specified by reference picture index refIdxLX. If block X is subject to inter-prediction, then the time order (POC) of the reference picture indicated by reference picture index refIdxLX of the target block is compared with the time order (POC) of the reference picture indicated by reference picture index refIdxLX of block X (X=0 or 1). Specifically, the following two orders are compared.

PicOrderCnt(RefPicList0[refIdxL0])
PicOrderCnt(RefPicList0[refIdxL0 of blockX])

Where RefPicListX is an array for referencing a reference picture from reference picture index redIdxLX and PicOrderCnt(x) is a function for obtaining the display order of reference pictures specified by argument x. For reference picture index refIdxL0 for the L0 list of the target list, reference picture index refIdxL0 for the L0 list of block X and vectors for reference list L0 are referenced, but reference picture index ref_L1idx for reference list L1 of block X and vectors for reference list L0 may be referenced. This is the same as for reference picture index refIdxL1 for reference list L1 of the target block.

When the above time orders are different, the vector of block X stored in the vector memory is a motion vector, the motion vector is available, and motion vector mvLX is derived.

In contrast, when the above time orders are the same, the vector of block X stored in the vector memory is a disparity vector, the disparity vector is available, and disparity vector mvLX is derived.

The disparity vector acquisition unit 119 acquires the disparity vector Dv of a block adjacent to the target block. The disparity vector acquisition unit 119 includes an adjacent disparity vector deriving unit, a time disparity vector deriving unit, and a fixed disparity vector deriving unit, which are not shown. The disparity vector acquisition unit 119 acquires disparity vectors in the order of an adjacent disparity vector and a temporal disparity vector, as described later. Upon acquiring one of the disparity vectors, the disparity vector acquisition unit 119 outputs the disparity vector as the first candidate vector. When acquiring no disparity vector, the disparity vector acquisition unit 119 outputs a zero vector as the first candidate vector.

Figure 8:
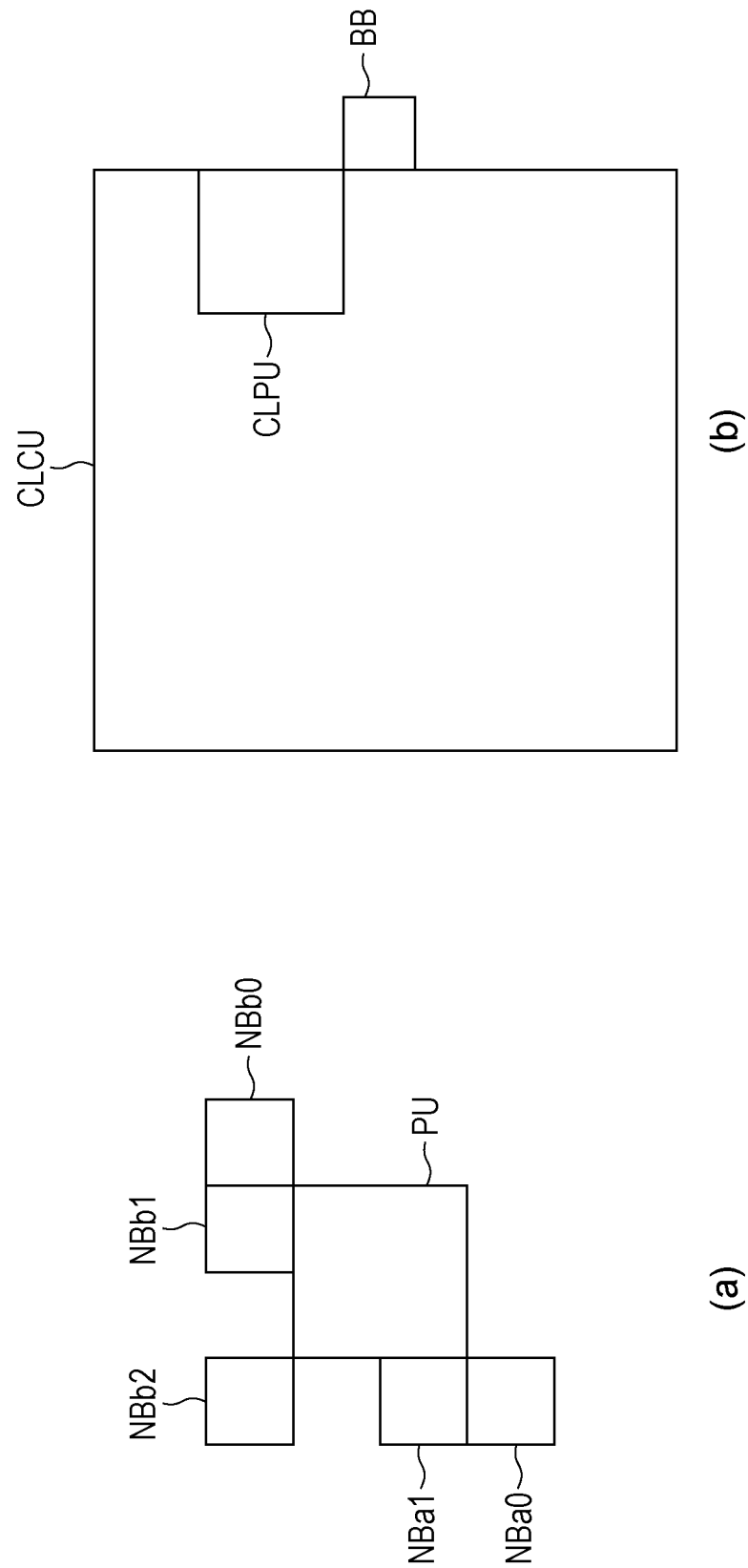
FIG. 8 shows the relationship between a target block and adjacent blocks according to the embodiment.

FIG. 8(*a*) shows the relationship between the target block and its adjacent blocks. The adjacent blocks of target block PU for which disparity vectors are read are blocks NBa0, NBa1, NBb0, NBb1, and NBb2 in the drawing.

An adjacent disparity vector acquisition unit of the disparity vector acquisition unit 119 references the availability of the parity vectors of blocks NBa0 and NBa1 adjacent to the left side of the target block in the order of blocks NBa0 and NBa1. When an available disparity vector is present, the disparity vector of the block referenced first is specified as the first candidate vector. When no available disparity vector is present in any of the blocks adjacent to the left side, the adjacent disparity vector acquisition unit further references the availability of the disparity vectors of blocks NBb0, NBb1, and NBb2 adjacent to the top of the target block in the order of blocks NBb0, NBb1, and NBb2. When an available disparity vector is present, the disparity vector of the block referenced first is specified as the first candidate vector.

When no disparity vector is present in any of the adjacent blocks, the time disparity vector acquisition unit of the disparity vector acquisition unit 119 acquires a disparity vector of a block included in a reference picture with a temporally different display order pointed by the motion vector acquired by the motion vector acquisition unit 118.

When no disparity vector can be acquired in the adjacent disparity vector acquisition unit and the time disparity vector acquisition unit, the disparity vector acquisition unit 119 assumes the first candidate vector as a zero vector in a fixed disparity vector acquisition unit.

When a disparity vector with respect to the block pointed by a motion vector is acquired, the process for acquiring information of a block present in a temporally different picture is required in addition to the process for deriving the motion vector. Since these processes include many processing steps (deriving a motion vector and referencing a different picture), it takes much processing time. In addition, encoding information of a different picture is generally placed in a memory with a relatively large delay. That is, when there are a plurality of memory units (such as a register, first cache, second cache, and external memory), if there is a tradeoff between latency and capacity, encoding information referenced by the time disparity vector acquisition unit is placed in a memory unit with a larger delay as compared with encoding information around the target block referenced by the adjacent disparity vector acquisition unit. Accordingly, the amount of computation (processing time) of processing by the time disparity vector acquisition unit is large.

In the acquisition of the above vectors, the motion vector acquisition unit 118 and the disparity vector acquisition unit 119 switch the processing with reference to block information Ib. For example, if the block size of a target block included in the block information Ib is less than a predetermined size (for example, 16×16), the disparity vector acquisition unit 119 acquires only the disparity vector with respect to the block adjacent to a target block or only the fixed vector without acquiring the disparity vector referencing a motion vector. In addition, the motion vector acquisition unit 118 does not acquire the motion vector used to acquire a disparity vector.

Specifically, when the block size is equal to or more than the predetermined size, the disparity vector acquisition unit 119 acquires a disparity vector through the adjacent disparity vector acquisition unit, the time disparity vector acquisition unit, and the fixed disparity vector acquisition unit in this order. When the block size is less than the predetermined size, the disparity vector acquisition unit 119 acquires a disparity vector through the adjacent disparity vector acquisition unit and the fixed disparity vector acquisition unit in this order, excluding the time disparity vector acquisition unit.

In such a structure, when the block size is small and the number of blocks is large, it is possible to suppress increases in the amount of processing due to reference to motion vectors and reference to encoding parameters of different pictures. The block size may be determined by using a PU size, which is the size of a prediction block (PU) or the size of a CU, which is a structure including a PU. Alternatively, a CU size and a PU partitioning type, which are equivalent to the size of a PU, may be used.

Although processing is switched based on block information Ib in the motion vector acquisition unit 118 and the disparity vector acquisition unit 119 in the above example, processing may be switched based on encoding conditions instead of block information Ib. For example, in the case of encoding conditions targeted for low load processing or low delay transmission, the disparity vector acquisition unit 119 may acquire disparity vectors using only information of adjacent blocks without operating the motion vector acquisition unit 118. In the encoding conditions targeted for high quality transmission, the motion vector acquisition unit 118 and the disparity vector acquisition unit 119 may operate constantly to acquire disparity vectors with reference to disparity vectors and motion vectors of adjacent blocks.

Figure 15:
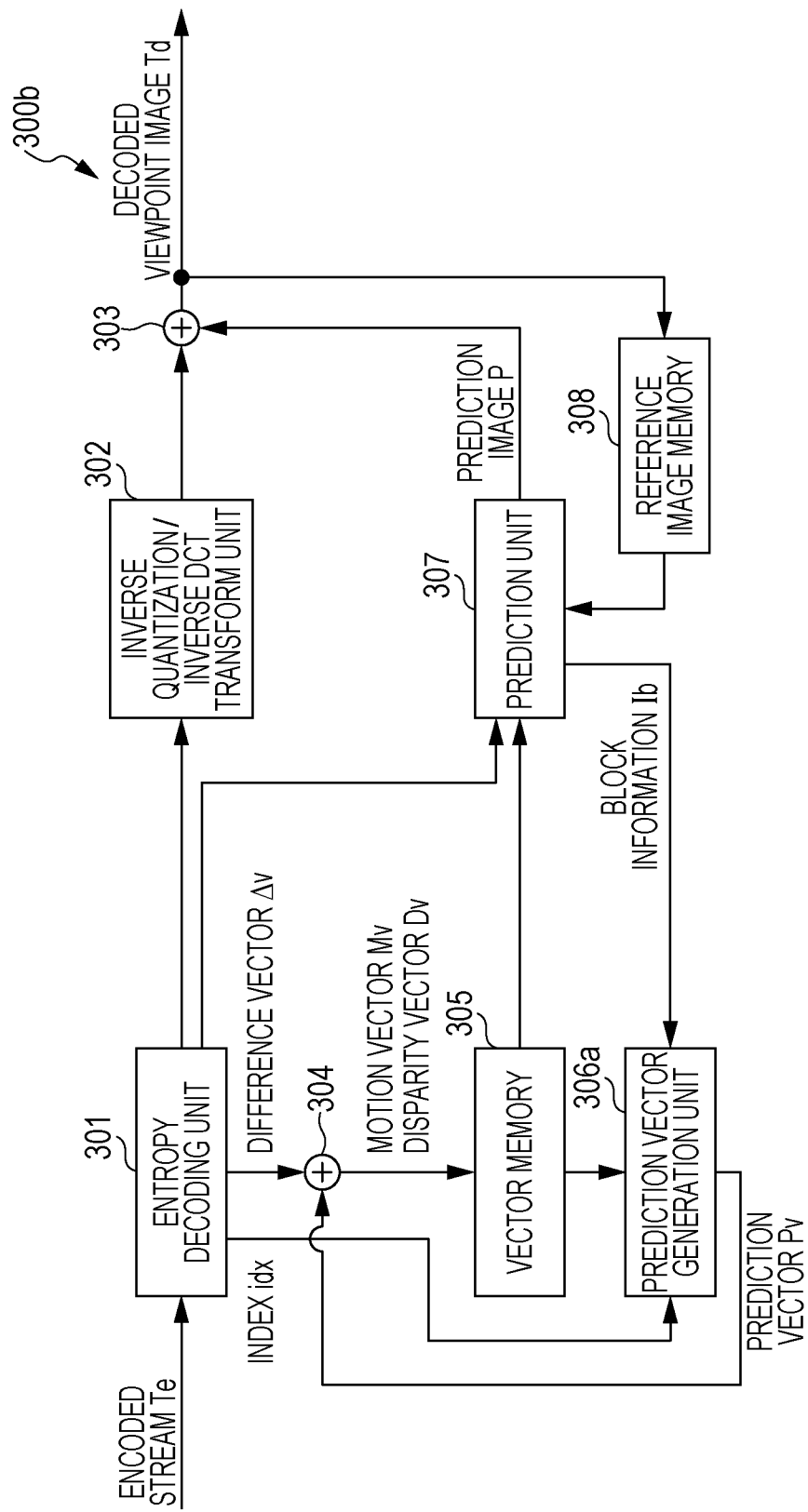
FIG. 15 is a block diagram schematically showing the structure of an image decoding device 300b according to the embodiment.

FIG. 15 is a block diagram schematically showing the structure of an image decoding device 300b. In FIG. 15, the components corresponding to those in FIG. 10 are given the same reference characters (301 to 305, 307, and 308) and descriptions are omitted. As shown in FIG. 15, the image decoding device 300b includes the entropy decoding unit 301, the inverse quantization/inverse DCT transform unit 302, the addition unit 303, the addition unit 304, the vector memory 305, a prediction vector generation unit 306a, the prediction unit 307, and the reference image memory 308.

Figure 16:
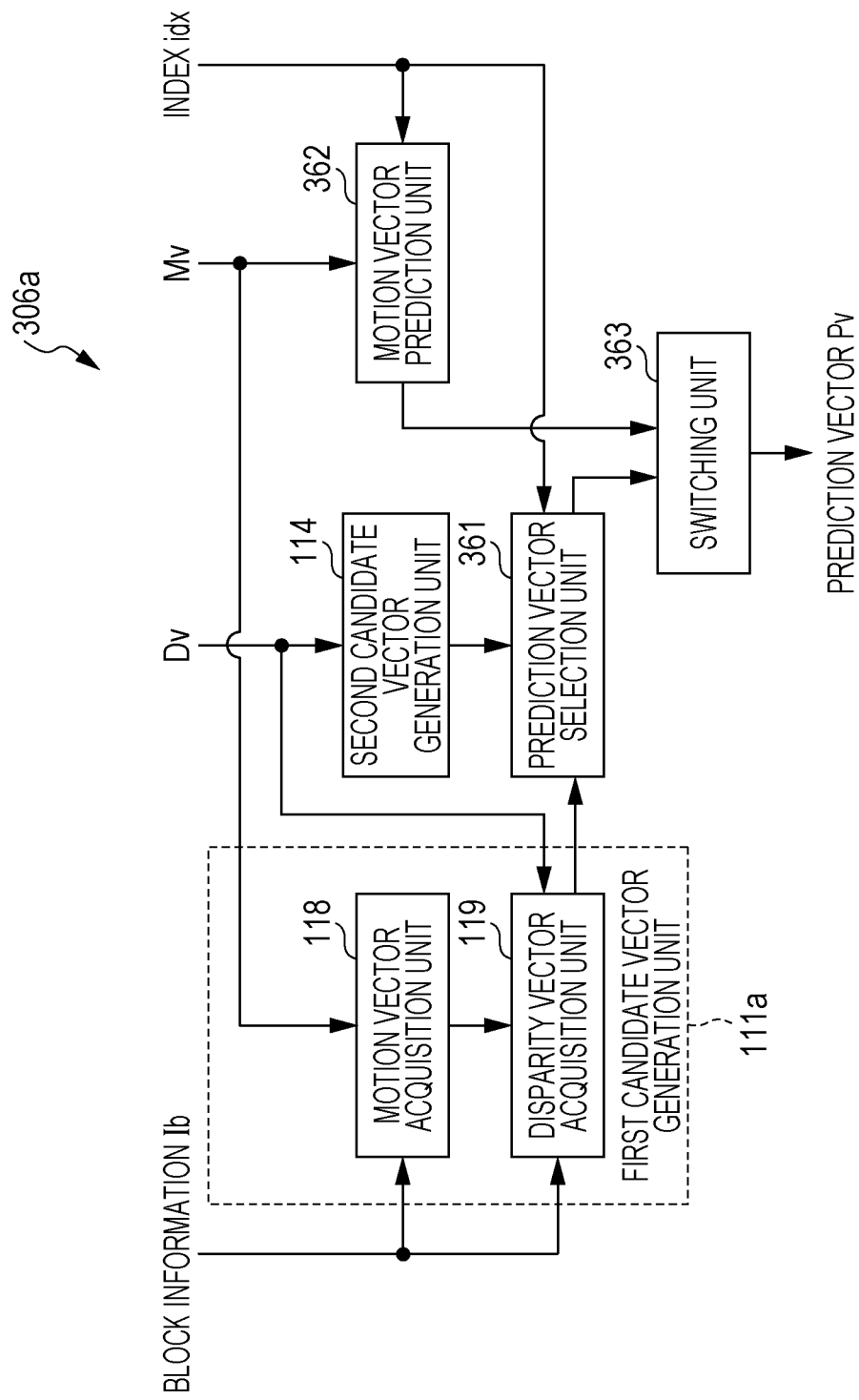
FIG. 16 is a block diagram schematically showing the structure of a prediction vector generation unit 306a according to the embodiment.

FIG. 16 is a block diagram schematically showing the structure of the prediction vector generation unit 306a. As shown in FIG. 16, the prediction vector generation unit 306a includes the first candidate vector generation unit 111a, the second candidate vector generation unit 114, the prediction vector selection unit 361, the motion vector prediction unit 362, and the switching unit 363. The first candidate vector generation unit 111a includes the motion vector acquisition unit 118 and the disparity vector acquisition unit 119. In FIG. 16, the components are the same as those in FIG. 11 or FIG. 14 and descriptions are omitted.

Also in the present embodiment, as in the first embodiment, the amount of computation in encoding/decoding can be reduced with the disparity vector prediction precision kept good.

A program for achieving the functions of the image encoding device 100, the image decoding device 300, the image encoding devices 100a and 100b, and the image decoding devices 300a and 300b or a part of the functions may be recorded in a computer-readable recording medium, and a computer system may read and execute the program recorded in the recording medium to achieve these devices. The computer system includes an OS and hardware such as peripheral devices.

The computer-readable recording medium is a portable medium such as a flexible disk, optical magnetic disk, ROM, or CD-ROM or a recording device such as a hard disk drive built into the computer system. The computer-readable recording medium also includes an object that holds the program dynamically for a short time, such as a communication cable used when the program is transmitted via a network such as the Internet or a communication line such as a phone line, as well as an object that holds the program for a certain period, such as a volatile memory in the computer system functioning as a server or client in this case. The program may achieve a part of the above functions or achieve the above functions in combination with another program already recorded in the computer system.

In addition, a part or all of the image encoding device 100, the image decoding device 300, the image encoding devices 100a and 100b, and the image decoding devices 300a and 300b may be realized typically as an LSI, which is an integrated circuit. The function blocks of the devices may be individually achieved as processors or a part or all of the functions may be integrated and achieved as a processor. The method for realization as an integrated circuit may be achieved not only as an LSI, but also as a specific circuit or general-purpose processor. If an integration technique replacing an LSI appears due to advance in semiconductor technology, an integrated circuit manufactured by this integration technique may be used.

Although embodiments of the present invention have been described above with reference to the drawings, the specific structure is not limited to the embodiments and a design change and so on may be included without departing from the spirit of the present invention.

DESCRIPTION OF REFERENCE NUMERALS 10 image transmission system
100, 100a, 100b image encoding device
101 subtraction unit
102 DCT transform/quantization unit
103 entropy encoding unit
104 inverse quantization/inverse DCT transform unit
105 addition unit
106 reference image memory
107 prediction unit
108 subtraction unit
109 vector memory
110, 110a prediction vector generation unit
111, 111b first candidate vector generation unit
112 conversion pixel determination unit
113 disparity vector conversion unit
114 second candidate vector generation unit
115 prediction vector determination unit
116 motion vector prediction unit
117 switching unit
118 motion vector acquisition unit
119 disparity vector acquisition unit
121 depth map encoding unit
122 depth map memory
123 depth map generation unit
200 network
300, 300a image decoding device
301 entropy decoding unit
302 inverse quantization/inverse DCT transform unit
303 addition unit
304 addition unit
305 vector memory
306, 306a prediction vector generation unit
307 prediction unit
308 reference image memory
309 depth map decoding unit
310 depth map memory
311 depth map generation unit
361 prediction vector selection unit
362 motion vector prediction unit
363 switching unit
400 free viewpoint image display device

The invention claimed is:

1. A prediction vector generation device configured to generate a prediction vector of a disparity vector of a target block in a non-base viewpoint image, the prediction vector generation device comprising:
  a disparity vector conversion unit configured to calculate a representative value using depth values of pixel positions at four corners of a block corresponding to the target block in a depth map corresponding to the non-base viewpoint image and convert the representative value into a disparity vector; and
  a prediction vector determination unit configured to generate the prediction vector of the disparity vector of the target block by using the disparity vector generated by the disparity vector conversion unit.

2. The prediction vector generation device according to claim 1, wherein the representative value is a maximum value of the depth values of the pixel positions at the four corners.

* * * * *